United States Patent
Takahashi et al.

(10) Patent No.: US 11,856,506 B2
(45) Date of Patent: Dec. 26, 2023

(54) USER EQUIPMENT AND BASE STATION

(71) Applicant: NTT DOCOMO, INC., Tokyo (JP)

(72) Inventors: Hideaki Takahashi, Tokyo (JP); Wuri Andarmawanti Hapsari, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/099,900

(22) PCT Filed: Mar. 23, 2017

(86) PCT No.: PCT/JP2017/011888
§ 371 (c)(1),
(2) Date: Nov. 8, 2018

(87) PCT Pub. No.: WO2017/195478
PCT Pub. Date: Nov. 16, 2017

(65) Prior Publication Data
US 2019/0159110 A1    May 23, 2019

(30) Foreign Application Priority Data

May 12, 2016 (JP) ................................ 2016-096525
Aug. 10, 2016 (JP) ................................ 2016-158262

(51) Int. Cl.
*H04W 48/10*        (2009.01)
*H04W 48/14*        (2009.01)

(52) U.S. Cl.
CPC ........... *H04W 48/14* (2013.01); *H04W 48/10* (2013.01)

(58) Field of Classification Search
CPC ... H04W 48/14; H04W 48/10; H04W 68/005; H04W 48/12
See application file for complete search history.

(56) References Cited

U.S. PATENT DOCUMENTS

| | | |
|---|---|---|
| 10,390,331 B2 | 8/2019 | Adjakple et al. |
| 2010/0027466 A1 | 2/2010 | Mustapha |
| 2010/0093350 A1 | 4/2010 | Wang et al. |
| 2010/0174809 A1* | 7/2010 | Chun .................... H04W 48/08 709/221 |
| 2012/0322467 A1 | 12/2012 | Obuchi et al. |

(Continued)

FOREIGN PATENT DOCUMENTS

| | | |
|---|---|---|
| CN | 102970729 A | 3/2013 |
| EP | 3476157 A1 | 5/2019 |

(Continued)

OTHER PUBLICATIONS

International Search Report issued in corresponding International Patent Application No. PCT/JP2017/011888, dated Jun. 6, 2017 (11 pages).

(Continued)

*Primary Examiner* — Marcos L Torres
(74) *Attorney, Agent, or Firm* — Osha Bergman Watanabe & Burton LLP

(57) ABSTRACT

A user equipment that communicates with a base station in a mobile communication system includes: a receiving unit that receives a change message of system information from the base station; and a control unit that requests the base station to transmit the system information when the receiving unit has received the change message and then has not received the system information.

4 Claims, 24 Drawing Sheets

(56) References Cited

U.S. PATENT DOCUMENTS

| | | | |
|---|---|---|---|
| 2015/0164462 A1 | 6/2015 | Ohta et al. | |
| 2015/0245282 A1 | 8/2015 | Kim et al. | |
| 2015/0245340 A1* | 8/2015 | Cheng | H04W 52/0229 |
| | | | 370/331 |
| 2015/0256995 A1 | 9/2015 | Rune et al. | |
| 2015/0382284 A1 | 12/2015 | Brismar et al. | |
| 2016/0270013 A1* | 9/2016 | Soriaga | H04W 56/001 |
| 2017/0251500 A1* | 8/2017 | Agiwal | H04W 4/06 |
| 2019/0123871 A1* | 4/2019 | Maeda | H04L 5/0048 |
| 2019/0159110 A1 | 5/2019 | Takahashi et al. | |
| 2019/0306785 A1* | 10/2019 | Hahn | H04J 11/00 |
| 2020/0045743 A1* | 2/2020 | Lee | H04W 48/14 |

FOREIGN PATENT DOCUMENTS

| | | |
|---|---|---|
| JP | 2002-010348 A | 1/2002 |
| JP | 2010-516163 A | 5/2010 |
| JP | 2015-8500 A | 1/2015 |
| JP | 6938726 B2 | 9/2021 |
| WO | 2011/100570 A1 | 8/2011 |
| WO | 2011/111233 A1 | 9/2011 |
| WO | 2013/068369 A1 | 5/2013 |
| WO | 2016149026 A1 | 9/2016 |
| WO | 2017/150863 A1 | 9/2017 |
| WO | 2018/016922 A1 | 1/2018 |

OTHER PUBLICATIONS

Written Opinion issued in corresponding International Patent Application No. PCT/JP2017/011888, dated Jun. 6, 2017 (22 pages).
Samsung, "System Information Signalling Design in NR," 3GPP TSG-RAN WG2 Meeting #94, R2-163371, Nanjing, China, May 23-27, 2016 (8 pages).
3GPP TS 36.300 V13.3.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13)" Mar. 2016 (295 Pages).
3GPP TS 36.331 V13.1.0; "3rd Generation Partnership Project; Technical Specification Group Radio Access Network; Evolved Universal Terrestrial Radio Access (E-UTRA); Radio Resource Control (RRC); Protocol specification (Release 13)"; Mar. 2016 (551 Pages).
Extended European Search Report issued in counterpart European Patent Application No. 17795839.4, dated Oct. 7, 2019 (13 pages).
CATT; "Consideration on higher layer procedures in 5G NR"; 3GPP TSG-RAN WG2 Meeting #93bis, R2-162568; Dubrovnik, Croatia; Apr. 11-15, 2016 (3 pages).
Office Action issued in the counterpart Japanese Patent Application No. 2018-516375, dated Apr. 14, 2020 (6 pages).
Office Action issued in the counterpart Chinese Patent Application No. 201780028803.X, dated Aug. 3, 2020 (16 pages).
Office Action issued in Korean Application No. 10-2018-7032600; dated Feb. 22, 2021 (10 pages).
Office Action issued in Chinese Application No. 201780028803.x; dated Mar. 10, 2021 (10 pages).
Office Action issued in Australian Application No. 2017261994; dated Mar. 12, 2021 (5 pages).
Office Action issued in European Application No. 17795839.4; dated Mar. 25, 2021 (8 pages).
Office Action in counterpart Japanese Patent Application No. 2020-103225 dated Apr. 6, 2021 (6 pages).
Office Action issued in Australian Application No. 2017261994; dated Jul. 26, 2021 (5 pages).
Office Action issued in Indonesian Application No. PID201810201 dated Nov. 19, 2021 (4 pages).
Office Action issued in the counterpart Indian Patent Application No. 201817042693, dated Apr. 27, 2021 (5 pages).
Office Action issued in European Application No. 17795839.4, dated Oct. 21, 2022 (9 pages).
Sony; "System Information Area Scope and Value Tag"; 3GPP TSG RAN WG2 Meeting #93, R2-161140; St. Julian's, Malta; Feb. 15-19, 2016 (4 pages).

* cited by examiner

USER EQUIPMENT AND BASE STATION

TECHNICAL FIELD

The present invention relates to a user equipment and a base station in a mobile communication system.

BACKGROUND ART

As defined in a 3GPP (Non-Patent Document 1), in a conventional mobile communication system, system information is transmitted from a base station to a user equipment. The system information is periodically transmitted from the base station in a cell.

The system information includes system information which has to be acquired by all user equipments and system information which is necessary for only a specific user equipment.

Examples of the system information which has to be acquired by all user equipments include a master information block (MIB) and a system information block type 1 (SIB1). The MIB includes basic information such as a system bandwidth and the SIB1 includes scheduling information of a SIB subsequent to the SIB1.

Examples of the system information which is necessary for only a specific user equipment include a SIB17 (for WLAN interworking) and SIB18 and SIB19 (for a side link).

CITATION LIST

Non-Patent Document

Non-Patent Document 1: 3GPP TS 36.331 V12.8.0 (2015-12)

SUMMARY OF THE INVENTION

Problem to be Solved by the Invention

Regarding the system information which is necessary for only a specific user equipment, when such a specific user equipment is not present in the cell or when such a specific user equipment is present in the cell but the specific user equipment has necessary system information already, it is useless to periodically transmit the system information which is necessary for only the specific user equipment, thereby causing an increase in overheads.

Particularly, in a next-generation mobile communication system (5G, new RAT) for the purpose of ultra large capacity, ultralow delay, and the like, it is necessary to decrease overheads due to transmission of system information. Regarding the decrease in overheads due to transmission of system information, an idea that system information which is essential to all user equipments is periodically transmitted and other system information is transmitted based on a demand from a user equipment has been proposed (which is referred to as system information on demand).

In order to realize the system information on demand, it is necessary to cope with a change in system information, a difference in system information between cells, and the like, but such coping measures have not yet been specifically proposed. Also, specific proposals for requesting system information from the user equipment have not yet been made.

The invention is made in consideration of the above-mentioned circumstances and an object thereof is to provide a technique for realizing a decrease in overheads due to transmission of system information.

Means for Solving Problem

According to an embodiment of the invention, there is provided a user equipment that communicates with a base station in a mobile communication system, the user equipment including: a receiving unit configured to receive a change message of system information from the base station; and a control unit configured to request the base station to transmit the system information when the receiving unit has received the change message and then has not received the system information.

Effect of the Invention

According to the embodiment of the invention, it is possible to provide a technique for realizing a decrease in overheads due to transmission of system information.

MODES FOR CARRYING OUT THE INVENTION

Hereinafter, embodiments of the invention will be described with reference to the accompanying drawings. The embodiments described below are only examples and embodiments of the invention are not limited to the following embodiments.

A mobile communication system according to the embodiments is assumed to cope with a long term evolution (LTE) system. Here, the "LTE" used in this specification is assumed to have a broad meaning including an LTE-Advanced system and systems (such as 5G) subsequent to the LTE-Advanced. The embodiments of the invention are not limited to the LTE, but can be applied to other systems. For example, the embodiments of the invention may be applied to systems employing SUPER 3G, IMT-Advanced, 4G, 5G, future radio access (FRA), W-CDMA (registered trademark), GSM (registered trademark), CDMA2000, ultra mobile broadband (UMB), IEEE 802.11 (Wi-Fi), IEEE 802.16 (WiMAX), IEEE 802.20, ultra-wideband (UWB), Bluetooth (registered trademark), or other next-generation systems which are extended on the basis thereof.

(System Configuration, Basic Operation)

Figure 1:
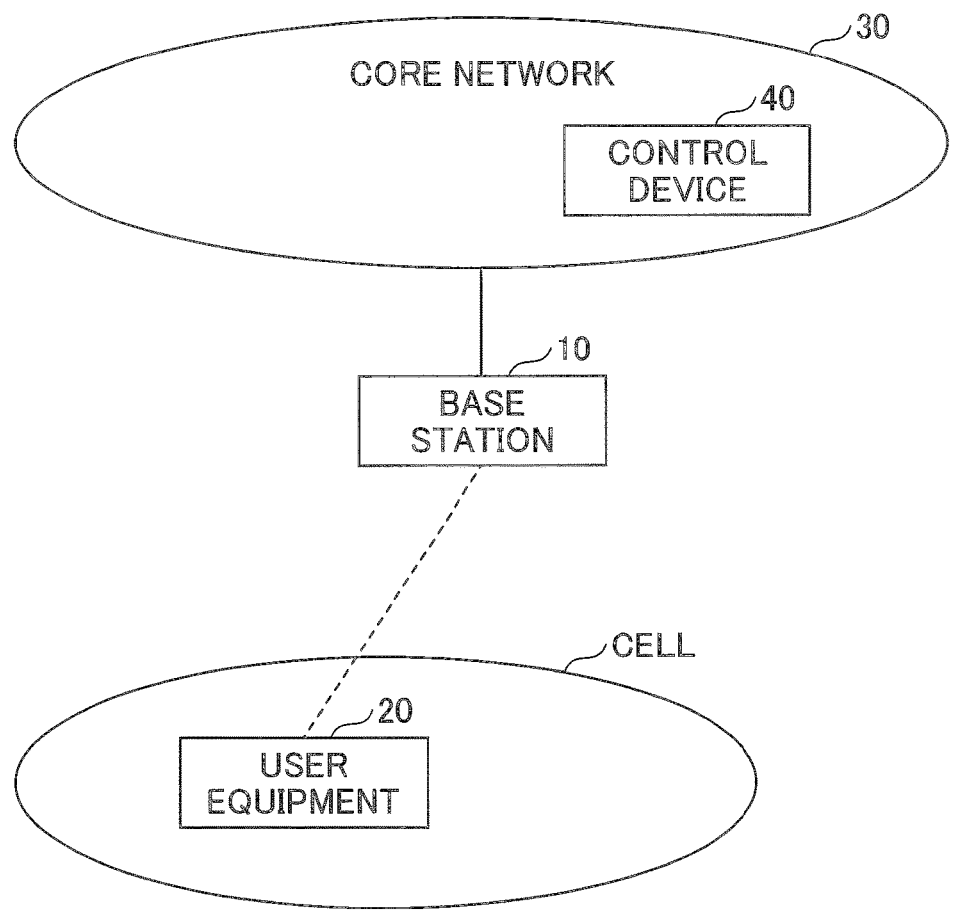
FIG. 1 is a diagram illustrating a configuration of a radio communication system according to an embodiment of the invention.

FIG. 1 illustrates an example of a configuration of a mobile communication system according to an embodiment. As illustrated in FIG. 1, the mobile communication system according to the embodiment includes a base station 10 that constitutes a cell and a user equipment 20 that communicates with the base station 10 in a radio communication manner. The base station 10 is connected to a core network 30, and the core network 30 includes a control device 40 that performs mobility control of user equipments or the like.

One user equipment 20 is illustrated in FIG. 1, but may plural user equipments UE are present in general.

In this embodiment, the base station 10 periodically transmits (broadcasts) system information (such as a system bandwidth, a system frame number, and a value tag to be described later) which is essential to all user equipments without receiving any request from the user equipments 20. The essential system information may be referred to as minimum system information. On the other hand, system information other than the system information essential to all the user equipments is basically transmitted on the basis of a request from the user equipment 20. Hereinafter, for the purpose of convenience, the system information other than the essential system information is referred to as a SIB. Here, it is assumed that the "SIB1" is included in the essential system information.

A channel which is used for the base station 10 to transmit the SIB is not limited to a specific channel, but it is assumed in this embodiment that the SIB is transmitted using a common control channel (CCCH) in which a user equipment 20 in an idle state can receive the SIB. Here, a channel other than the CCCH is also used in modified examples and detailed examples of SIB request to be described later.

For example, when a request for transmission of a SIB_A is received from the user equipment 20, the base station 10 transmits the SIB_A to the user equipment 20. For example, the base station 10 periodically transmits the SIB_A in a predetermined period after the request is received. In the period, the user equipment 20 receives and holds the SIB_A. When the period expires, the base station 10 stops transmission of the SIB_A.

(Operation When SIB is Changed)

Details of a SIB (such as a value of a parameter and a set value) are not always constant but may be changed by the base station 10. When details of the SIB are changed, the user equipment 20 using the SIB needs to acquire the changed SIB. An operation example thereof will be described below with reference to FIG. 2. Here, it is assumed that the SIB_A is changed. Hereinafter, an example in which the SIB_A which is a single SIB is changed is described, but even when plural SIBs are changed, the same processing is performed on each SIB.

Figure 2:
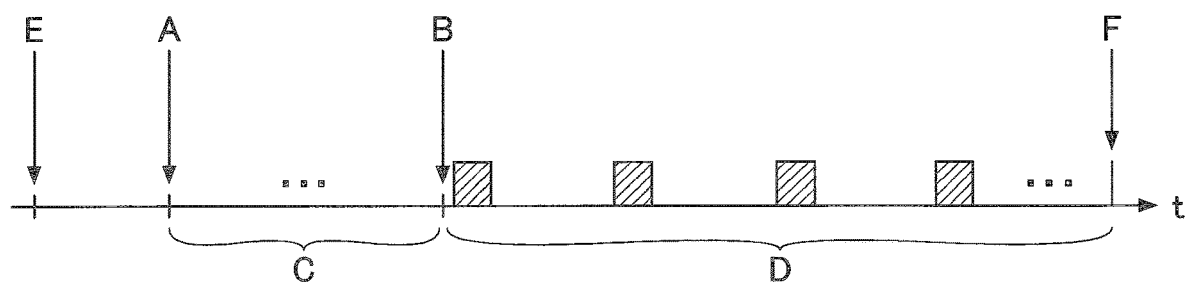
FIG. 2 is a diagram illustrating an example of a method of transmitting system information according to the embodiment.

In FIG. 2, prior to a time point indicated by A, transmission/transmission stop of the SIB_A are already performed and the user equipment 20 holds the SIB_A. Here, the already held SIB_A is referred to as an old SIB_A. For example, when the base station 10 is determined to transmit changed new SIB_A prior to the time point of A (or at the time point of A), a change message indicating that the SIB_A is changed is first transmitted at the time point of A. The change message is, for example, a paging message or a value tag. The change message in this embodiment includes information indicating that the specific SIB (SIB_A herein) is changed. Here, the change message may be a message not specifying a SIB to be changed but indicating that a certain SIB is changed. In this case, the SIB which is designated by a SIB request from the user equipment 20 described herein is all SIBs which is necessary for the user equipment 20.

In FIG. 2, the base station 10 may transmit the change message once at the time point of A, or may transmit the change message plural times (for example, periodically) in a predetermined period (a period indicated by C). Particularly, in this embodiment, the value tag is included in the essential system information (for example, SIB1) and is always periodically transmitted. The change of the SIB is broadcasted by changing the value of the value tag.

At a time point of B, the base station 10 starts transmission of a new SIB_A. In this example, the new SIB_A is periodically transmitted repeatedly in a period indicated by D. When the period indicated by D expires (a point of F), the transmission of the new SIB_A is stopped. The user equipment 20 receives and holds the new SIB_A in the period indicated by D.

A period indicated by C (from the time point of A to the time point of B) may be a BCCH modification period which is described in Non-Patent Document 1. A period from a time point of E prior to the time point of A (the first change message) to the time point of B (a time point at which transmission of the changed SIB is started) may be the BCCH modification period. The length of the period of D is not limited to a specific length, but may be, for example, N times the BCCH modification period (where N is an integer equal to or greater than 1).

For example, when the user equipment 20 cannot receive a signal from the base station 10 (for example, a power source is turned off) in the period from A to F in FIG. 2, the user equipment 20 which becomes a state in which it can receive a signal from the base station 10 thereafter recognizes that the SIB_A is changed by the change message (such as a value tag), but since the period which is indicated by D and in which the new SIB_A is transmitted expires, the user equipment cannot receive the new SIB_A in this state.

Therefore, in this embodiment, when the user equipment 20 detects a change of the SIB by the change message but does not received a changed SIB, the user equipment 20 transmits a message requesting the change SIB to the base station 10. The base station 10 receiving the request message transmits the requested changed SIB to the user equipment 20 as a request source.

A processing sequence in this case will be described below with reference to FIG. 3. In this example, description of SIB(s) is used to express that one or more SIBs are changed. It is assumed that the SIB(s) is a SIB necessary for the user equipment 20.

In Step S101, the base station 10 transmits a change message (such as a paging message or a value tag) indicating that the SIB(s) is changed. In Step S102, the user equipment 20 detects that a specific SIB(s) is changed by receiving the change message.

Figure 3:
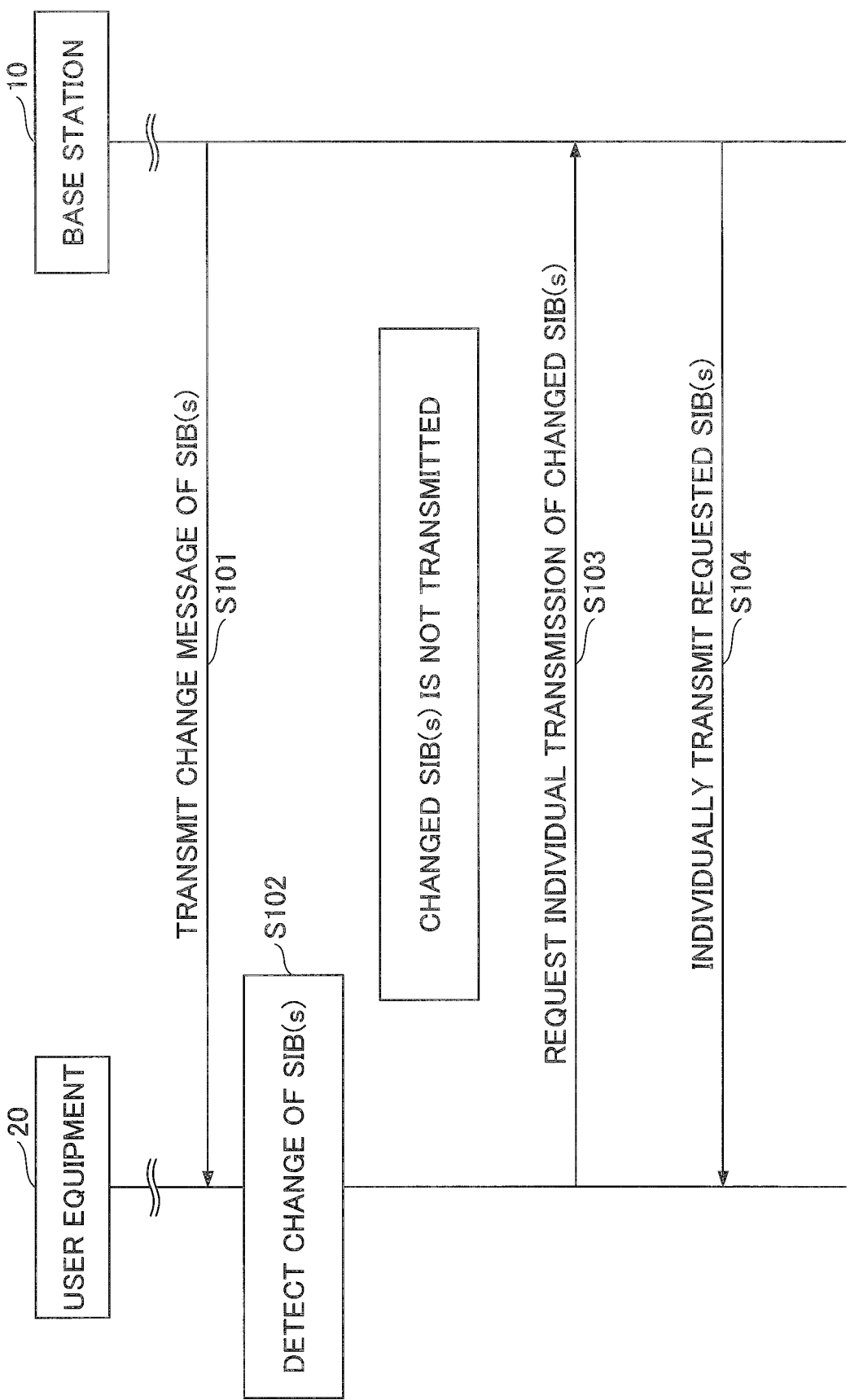
FIG. 3 is a sequence diagram illustrating a process of individually acquiring changed system information.

In the example illustrated in FIG. 3, the transmission of the changed SIB(s) ends at a time point prior to Step S101, and the user equipment 20 detecting that the SIB(s) is changed cannot receive the changed SIB(s) in Step S102.

For example, when the user equipment monitors a channel (the CCCH in this embodiment) in which the SIB(s) is transmitted but a predetermined time passes without receiving the changed SIB(s) from the time point at which the change of the SIB(s) is detected, the user equipment 20 transmits a request message requesting for individual transmission of the changed SIB(s) to the base station 10 (Step S103). The request message includes, for example, information (for example, a number of the SIB) for designating a SIB(s) which the user equipment 20 wants to acquire.

The case in which the request message is transmitted at the time point at which the predetermined time passes without receiving the changed SIB(s) from the time point at which the change of the SIB(s) is detected is an example. The request message may be transmitted at other timing.

The base station 10 receiving the request message transmits the requested SIB(s) to the user equipment 20 (Step S104). The transmission of the SIB(s) in Step S104 is performed in a predetermined period and the transmission is stopped when the predetermined period passes.

In this embodiment, the requested SIB(s) is transmitted using the CCCH. For the individual transmission to the user equipment 20, identification information of the user equipment 20 may be added to a header (for example, a MAC header) of a signal (including the request message) transmitted via the CCCH. The identification information of the user equipment 20 may be included in control information (for example, a DCI transmitted via a PDCCH) for notifying of a resource of the CCCH transmission. The SIB(s) may be transmitted using the CCCH without specifying the user equipment 20. In this case, the transmission is broadcast (broadcast transmission).

Any of the after-mentioned detailed examples 1-5 for SIB request method can be applied to the request of SIB(s) (S103) and transmission of SIB(s) (S104) shown in FIG. 3.

As illustrated in FIG. 3, the user equipment 20 requesting and receiving a SIB is assumed to be in an idle state or an inactive state, but may perform the operation illustrated in FIG. 3 in a connected state.

The above-mentioned CCCH transmission method, and the operation in which the idle state or the inactive state are assumed but the same is true of the connected state, can be applied to all examples (except for modified examples) to be described below.

(Example in which SIB(s) is Requested due to Expiration of Validity Period)

In the above-mentioned example, when the user equipment 20 detects that the SIB(s) is changed but does not receive the changed SIB(s), the user equipment requests the base station 10 to transmit the SIB(s), but the case in which the user equipment 20 requests the base station 10 to transmit the SIB(s) is not limited thereto and the following case can be considered.

A SIB(s) in this embodiment has a validity period. The validity period may be common to all the SIBs or may differ depending on the SIBs. The validity period may be a value which is notified from the base station 10 to the user equipment 20 or may be a value which is set in advance in the user equipment 20.

A validity period of a certain SIB is defined as T hours. In this case, at a time point at which the T hours pass without receiving a change message from the time point at which the SIB is received and held from the base station 20, the user equipment 20 determines that the validity period of the SIB expires, acquires the SIB by performing the processes of Steps S103 and S104 in FIG. 3, and newly starts measuring the validity period (the T hours). This operation is performed for each SIB which is held in the user equipment 20.

For example, when the user equipment 20 is powered off after receiving the SIB from the base station 20 and does not receive a change message after the user equipment is powered on, the user equipment 20 acquires the SIB by performing the processes of Steps S103 and S104 in FIG. 3 if the validity period has expired at the time point when the user equipment is powered on.

(Operation Example When SIB(s) Differs Depending on Cells)

A value of a parameter in the same type of SIBs may differ depending on cells. For example, in an existing SIB, there is a possibility that the value of a cell reselection parameter of the same frequency specific to a cell in a SIB4 will differ depending on the cells.

Figure 4:
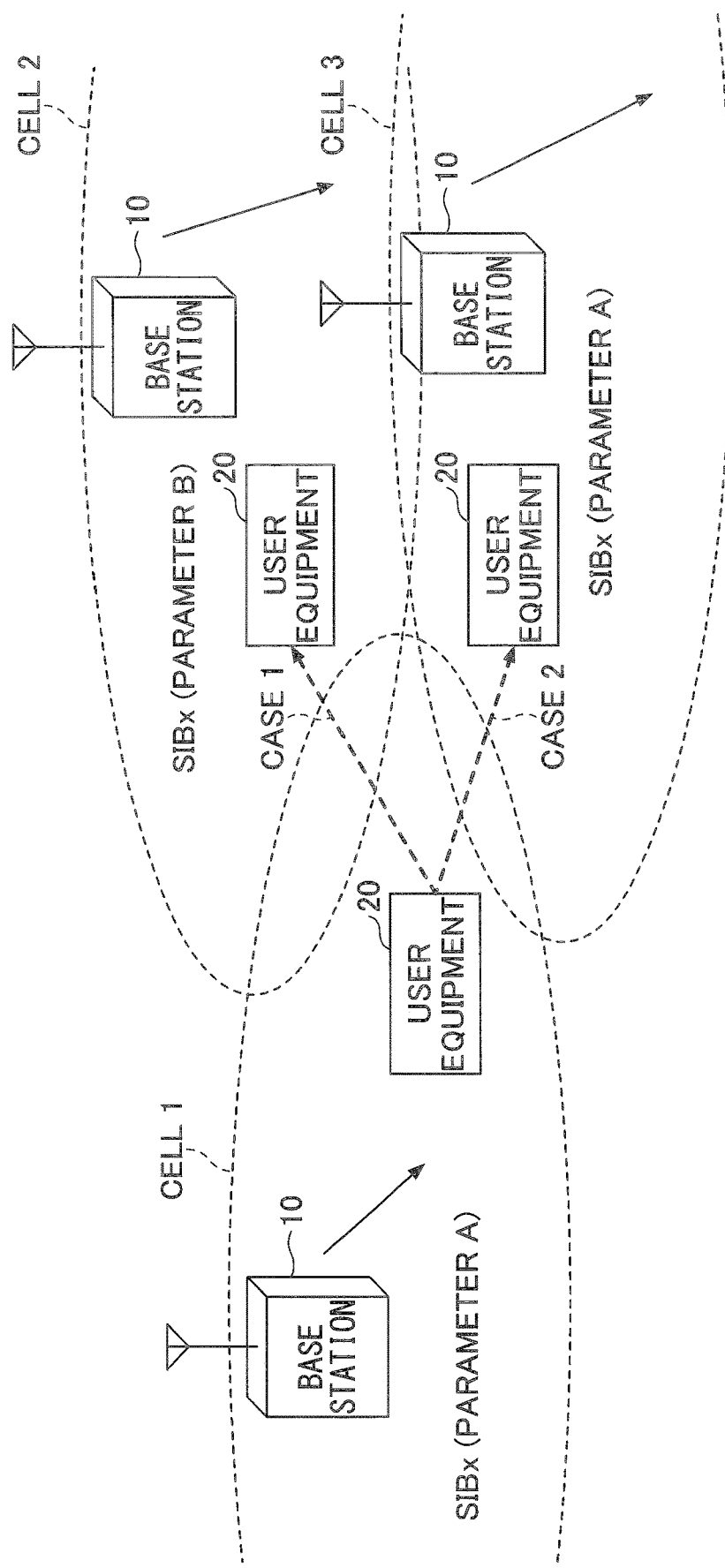
FIG. 4 is a diagram illustrating an example in which system information differs between cells.

FIG. 4 is a diagram illustrating an example of such a situation. In the example illustrated in FIG. 4, Cell 1, Cell 2, and Cell 3 are present and the base station 10 of each cell transmits a SIBx on the basis of a request from a user equipment which is serviced. The SIBx in Cell 1 and Cell 3 has parameter A, but the SIBx in Cell 2 has parameter B which is different from parameter A.

For example, as illustrated as Case 2 in FIG. 4, it is assumed that a user equipment 20 which is serviced in Cell 1 and has a SIBx within a validity period received in Cell 1 moves in an idle state to Cell 3 (camps on Cell 3 by cell reselection). Since the parameter of the SIBx is the same in Cell 3 and Cell 1, the user equipment 20 can continuously use the SIBx, which has been acquired in Cell 1, in Cell 2.

On the other hand, as illustrated as Case 1 in FIG. 4, it is assumed that a user equipment 20 having a SIBx within a validity period received in Cell 1 moves in an idle state to Cell 2 (camps on Cell 2 by cell reselection). Since the parameter of the SIBx differs in Cell 2 and Cell 1, the user equipment 20 cannot continuously use the SIBx, which has been acquired in Cell 1, in Cell 2. Alternatively, when the SIBx is continuously used, there is a possibility that the operation will not be appropriately performed. In this embodiment, when there is no request from the user equipment 20, a SIBx is not transmitted. Accordingly, there is a possibility that the operation will be continuously performed without using an appropriate SIBx in Cell 2.

Therefore, in this embodiment, the above-mentioned problem is solved using methods which are described below in Example 1 and Example 2.

EXAMPLE 1

In Example 1, when a SIB having details (such as a parameter) different from those in a neighboring cell is present in plural SIBs of each cell, information (which is referred to as SIB difference information) including identification information (such as a SIB number) of the different SIB is broadcasted in the cell. In Example 1, for example, when plural neighboring cells are present around the cell and at least one neighboring cell has a SIB having details different from those in the cell, the broadcast is performed. In this embodiment, the broadcast is performed using essential system information (such as an MIB and a SIB1), but is not limited thereto. The broadcast may be performed using another signal which is periodically transmitted in the cell, other than the essential system information (a broadcast signal).

More specifically, for example, since details of the SIBx in Cell 2 in FIG. 4 are different from details of a SIBx in a neighboring cell (Cell 1 in FIG. 4), the base station 10 of Cell 2 broadcasts SIB difference information indicating that the SIBx is different from the SIBx in the neighboring cell. The SIB difference information includes identification information of the SIBx.

When the SIB difference information is not transmitted, the user equipment 20 considers that details of all the SIBs in all the neighboring cells are the same as in the cell. When the details of all the SIBs in all the neighboring cells are the same as in the cell, the base station 10 of the cell may broadcast information indicating that the details of all the SIBs in all the neighboring cells are the same as in the cell as essential system information.

For example, a case in which the user equipment 20 receiving a SIBx in Cell 1 moves in an idle state to a neighboring cell (Cell 2) (when cell reselection is performed) is assumed. When the user equipment 20 detects that the SIBx in the neighboring cell is different from that in the cell (Cell 2) on the basis of the SIB difference information received in Cell 2, the user equipment requests the base station 10 of the cell to transmit a SIBx and acquires the SIBx. The operation of requesting/acquiring a SIB based on the SIB difference information may be performed once or plural times.

The processing sequence of the operation will be described below with reference to FIG. 5.

In Step S201, the user equipment 20 performs cell reselection and is serviced in a certain cell. For example, a SIB3, a SIB5, and a SIB6 in the cell are different from those in a neighboring cell. Accordingly, the base station 10 broadcasts SIB difference information indicating the SIB3, the SIB5, and the SIB6 are different from those in the neighboring cell (Step S202).

When the user equipment ascertains that the SIB3, the SIB5, and the SIB6 are different from those in the neighboring cell on the basis of the SIB difference information received in Step S202, the user equipment 20 transmits a request message for requesting the base station 10 to individually transmit the SIB3, SIB5, and the SIB6 to the base station 10 (Step S203). The request message includes information (for example, a SIB number) for designating a SIB(s) which the user equipment 20 wants to acquire. In the example, the user equipment 20 requires all of the SIB3, the SIB5, and the SIB6 and thus requests all thereof, but when the SIB difference information includes a SIB which is not necessary for the user equipment 20, the user equipment does not request transmission of the SIB.

The base station 10 receiving the request message transmits the requested SIB(s) to the user equipment 20 (Step S204). In this embodiment, the requested SIB(s) is transmitted using the CCCH. The transmission of a SIB(s) in Step S204 is performed in a predetermined period and when the predetermined period expires, the transmission is stopped.

Figure 5:
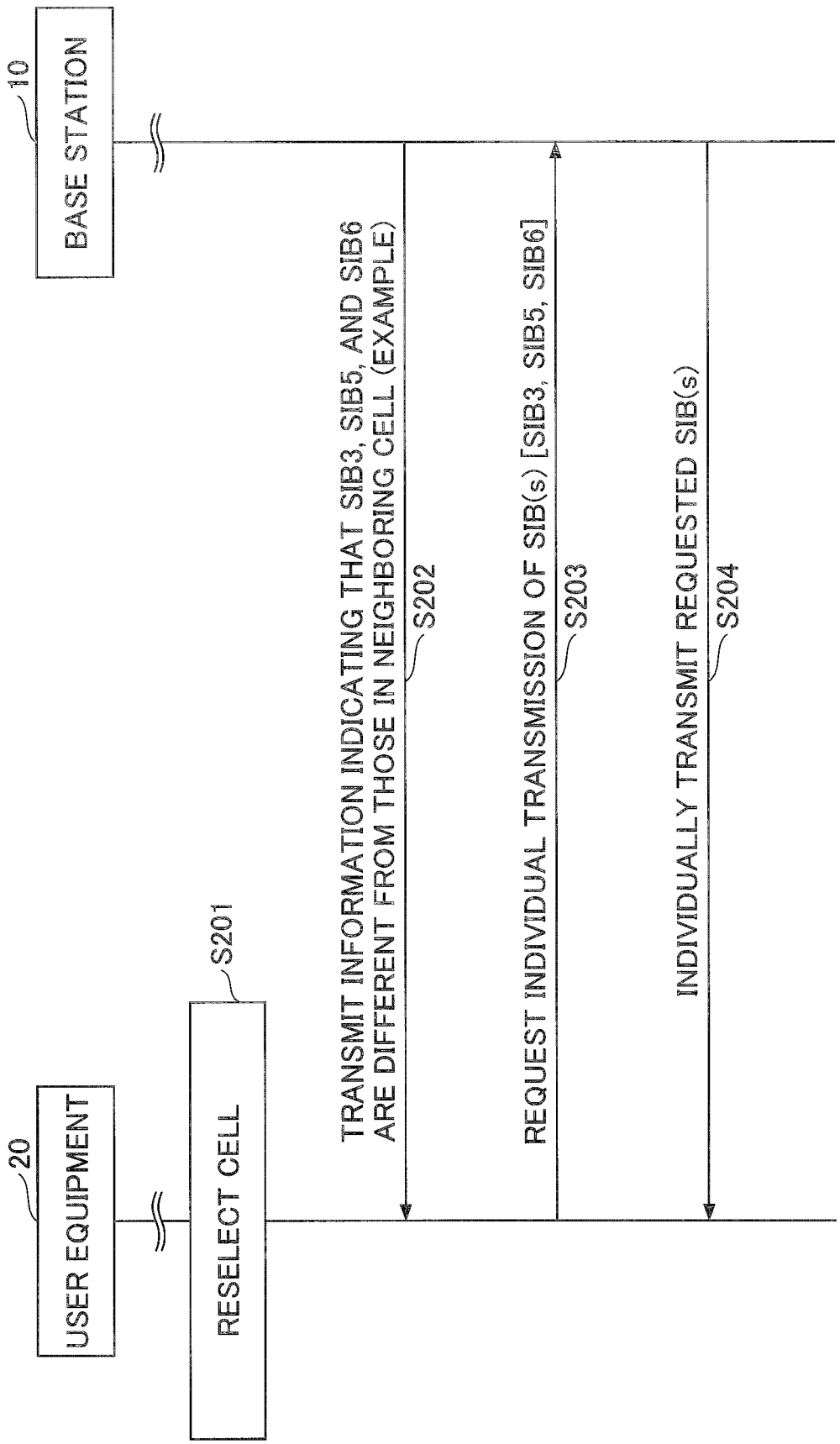
FIG. 5 is a sequence diagram illustrating an example in which system information differs between cells.

Any of the after-mentioned detailed examples 1-5 for SIB request method can be applied to the request of SIB(s) (S203) and transmission of SIB(s) (S204) shown in FIG. 5.

EXAMPLE 2

In Example 1, when the user equipment 20 moves from Cell 1 to Cell 3 in the example illustrated in FIG. 4, the user equipment 20 performs the operation of acquiring a SIBx in Cell 3, similar to the case in which the user equipment moves from Cell 1 to Cell 2. This is because the SIB difference information indicating that the SIBx is different from that in the neighboring cell (Cell 2 herein) in Cell 3 is broadcasted. However, since details of the SIBx are the same in Cell 1 and Cell 3, such an operation is wasteful. In Example 2, this wasteful operation is removed.

Figure 6:
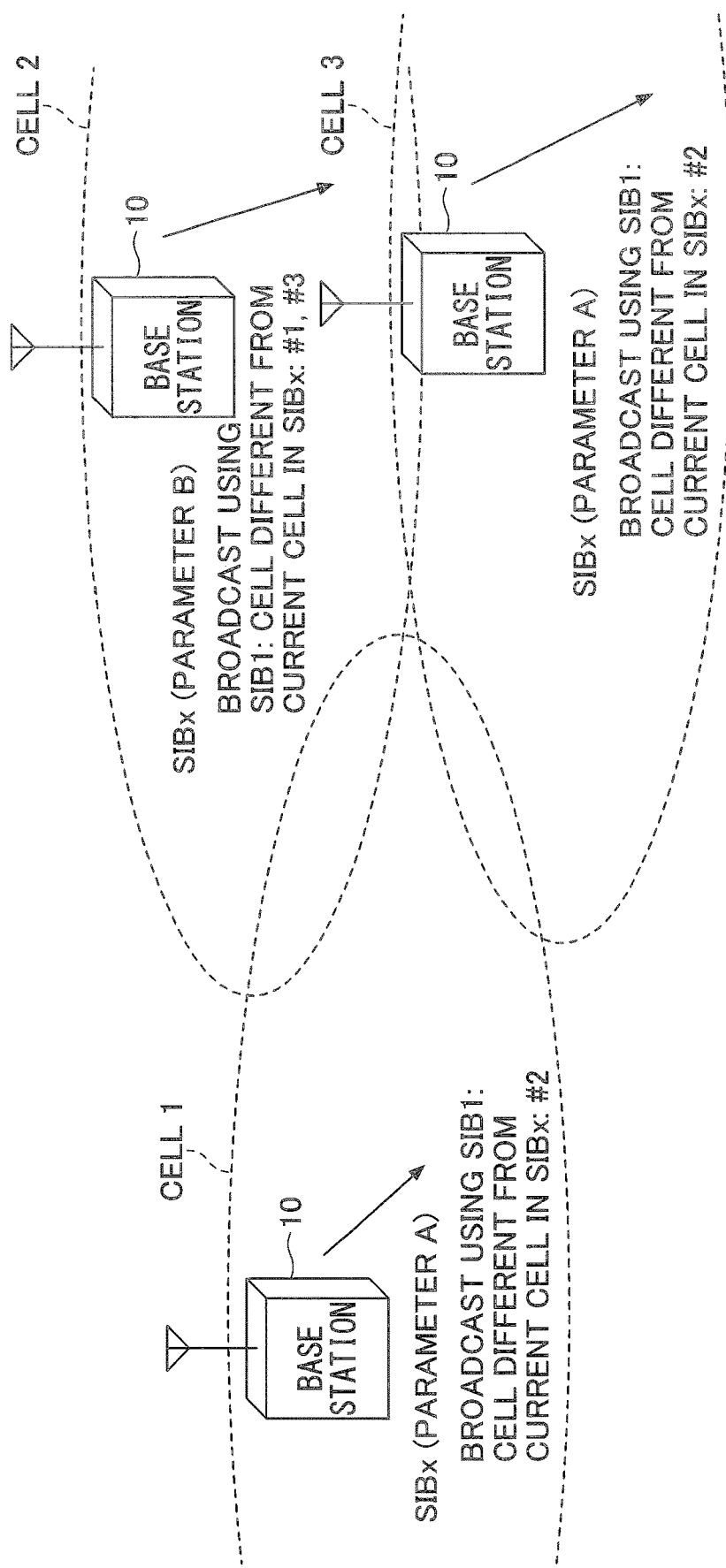
FIG. 6 is a sequence diagram illustrating another example in which system information differs between cells.

Example 2 is different from Example 1 in details of the SIB difference information transmitted from the base station 10. That is, in Example 2, the SIB difference information transmitted in each cell (a current cell) includes information indicating which SIB of which neighboring cell is different from that in the current cell. An example will be described below with reference to FIG. 6. FIG. 6 illustrates the same situation as in FIG. 4. That is, the SIBx in Cell 1 and Cell 3 has parameter A, but the SIBx in Cell 2 has parameter B different from parameter A. In FIG. 6, the SIB difference information is broadcasted using the SIB1.

In Example 2, in Cell 1, SIB difference information indicating that the SIBx of the cell is different from the SIBx of Cell 2 is broadcasted. In Cell 2, SIB difference information indicating that the SIBx of the cell is different from the SIBx of Cell 1 and Cell 3 is broadcasted. In Cell 3, SIB difference information indicating that the SIBx of the cell is different from the SIBx of Cell 2 is broadcasted.

The processing sequence in Example 2 is the same as illustrated in FIG. 5. In Example 2, the above-mentioned SIB difference information is broadcasted in Step S202, and the user equipment 20 performs Steps S203 and S204 only when a SIB transmission request is necessary in consideration of the relationship with a cell as a movement source.

For example, in the example illustrated in FIG. 6, when the user equipment 20 receiving the SIBx in Cell 1 moves to Cell 2, the user equipment 20 detects that the SIBx in Cell 2 is different from the SIBx of Cell 1 as the movement source on the basis of the SIB difference information and thus requests and receives the SIBx in Cell 2.

On the other hand, in the example illustrated in FIG. 6, when the user equipment 20 receiving the SIBx in Cell 1 moves to Cell 3, the user equipment 20 detects that a SIB different from that of Cell 1 as the movement source is not present in Cell 3 on the basis of the SIB difference information and thus does not request and receive a SIBx.

(Example in which Area in which SIB(s) is not Changed is Defined)

In the mobile communication system according to this embodiment, when an area in which a SIB is not changed in cells is provided and a user equipment exits from the area and enters another area, a SIB request may be transmitted.

The area is, for example, an area including plural cells. The "SIB is not changed" means that details of all SIBs are not changed in any of the insides of the cells of the area and the boundaries between the cells. For example, when a SIB_A is present as a SIB of a certain area, a parameter of the SIB_A is the same in any cell of the area. Hereinafter, such an area is referred to as a SIB common area.

Figure 7:
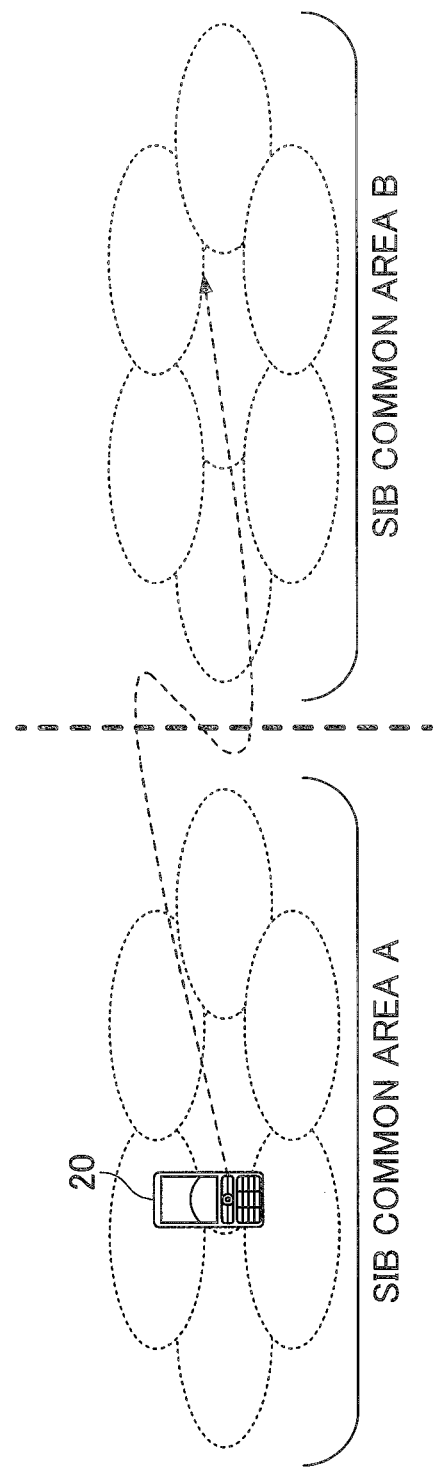
FIG. 7 is a diagram illustrating an example in which an area in which system information is not changed is defined.

An example thereof is illustrated in FIG. 7. In the example illustrated in FIG. 7, SIB common area A and SIB common area B are illustrated. In one SIB common area, details of each SIB are not changed but fixed in the cells. It is assumed that different SIB common areas are different from each other in details of each SIB. However, the different SIB common areas may be the same as each other in details of each SIB.

In the example illustrated in FIG. 7, a user equipment 20 which moves in SIB common area A does not request a base station 10 of a cell in which the user equipment is serviced to transmit a SIB(s) as illustrated in FIG. 5. On the other hand, when the user equipment 20 moves from SIB common area A to SIB common area B, for example, the user equipment 20 acquires a SIB(s) which is necessary for the user equipment by applying the mechanism of Example 2 described above with reference to FIG. 6 to the area.

For example, a base station 10 of each cell belonging to a certain SIB common area broadcasts identification information (ID) of the SIB common area and SIB difference information in the unit of an area as essential system information. For example, in the example illustrated in FIG. 7, it is assumed that details of a SIBx are different between SIB common area A and SIB common area B. In this case, a base station 10 of each cell belonging to SIB common area A broadcasts information indicating that the SIBx of the area is different from the SIBx of SIB common area B as the SIB difference information along with an ID of the area. A base station 10 of each cell belonging to SIB common area B broadcasts information indicating that the SIBx of the area is different from the SIBx of SIB common area A as the SIB difference information along with an ID of the area.

For example, when a user equipment 20 acquiring the SIBx in SIB common area A moves from SIB common area A to a cell in SIB common area B, the user equipment 20 detects that the user equipment moves to SIB common area B from the ID of the SIB common area included in the essential system information, detects that the SIBx in SIB common area B is different from that in SIB common area A as the movement source from the SIB difference information, requests a SIBx to the base station 10 of the serving cell on the basis of the detection result, and acquires the SIBx.

The SIB difference information in the unit of an area is used in the above-mentioned example, but the SIB difference information may not be used. In this case, when it is detected that the user equipment moves to a different SIB common area on the basis of the ID of the SIB common area, the user equipment 20 requests a necessary SIB(s) to the base station 10 of the serving cell and acquires the SIB(s).

The processing sequence in the latter example will be described below with reference to FIG. 8. In Step S301, the user equipment 20 detects that the user equipment moves from a certain SIB common area to another SIB common area. Then, in Step S302, the user equipment 20 requests a necessary SIB(s) to the base station 10 of the serving cell. The user equipment 20 receives the requested SIB(s) from the base station 10 (Step S303). Transmission of a SIB(s) in Step S303 is performed in a predetermined period and the transmission is stopped when the predetermined period expires.

Figure 8:
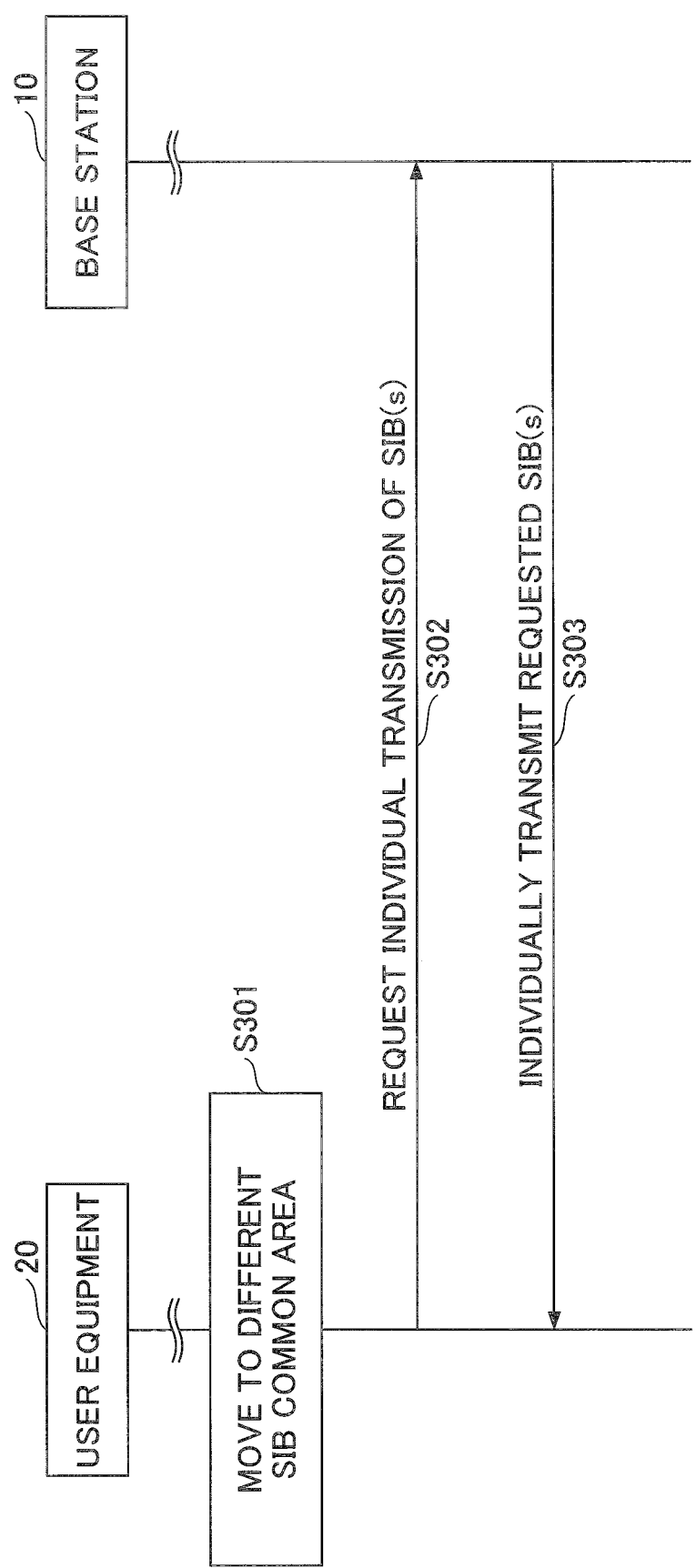
FIG. 8 is a sequence diagram illustrating an example in which an area in which system information is not changed is defined.

Any of the after-mentioned detailed examples 1-5 for SIB request method can be applied to the request of SIB(s) (S303) and transmission of SIB(s) (S303) shown in FIG. 8.

The ID of a SIB common area may be set in advance in each base station 10 or the control device 40 of the core network 30 may manage a corresponding relationship between SIB common areas and cells (base stations) and the control device 40 may transmit the ID of the SIB common area based on the corresponding relationship to the base stations. For example, when details of the SIB(s) are changed in some cells, the control device 40 updates the corresponding relationship between SIB common areas and cells (base stations) and transmits the ID of the SIB common area based on the updated corresponding relationship to the base stations.

MODIFIED EXAMPLES

In the examples described above, a case in which a SIB(s) is changed, a case in which the user equipment 20 moves to another cell, and the like are described on the premise that the user equipment 20 acquires the SIB(s) in a certain cell.

Here, when a user equipment 20 is attached to a network after being powered on, a case in which the user equipment 20 does not hold system information at all is considered. In this way, when the user equipment 20 does not hold system information at all in a certain cell, there is a problem (referred to as Problem 1) in that it is not clear what the user equipment 20 should determine in Case A and Case B.

Case A) A current cell (a base station of the cell) does not always broadcast a certain SIB(s) but copes with the function of the SIB(s). That is, the cell supports the SIB(s).

Case B) Since a current cell (a base station of the cell) does not cope with the function of a certain SIB(s), the cell does not broadcast the SIB(s) at all.

In Case A, when a certain SIB(s) is not always broadcasted, for example, it means that the SIB(s) is not broadcasted at all at a normal time and is broadcasted in a predetermined time at a change time as described above. The SIB(s) is individually notified on the basis of a request from a user equipment 20.

Case A corresponds to, for example, a following case. The base station of the cell does not always broadcast a SIB13 and a SIB15, but supports multimedia broadcast multicast services (MBMS). For example, a user equipment 20 performs operations corresponding to the parameters of the SIB13 and the SIB15 which are individually notified from another cell in the cell.

When a user equipment 20 does not hold system information at all, there is a problem (also referred to as Problem 2) in that it is not clear what specific procedure the user equipment 20 should perform to individually acquire a SIB(s) which has not been broadcasted.

Hereinafter, a solution to Problem 1 and a solution to Problem 2 in Modified Example 1 will be described. Variations of the solution to Problem 2 will be described in Modified Examples 2 to 5. The solution to Problem 1 in Modified Examples 2 to 5 is the same as the solution to Problem 1 in Modified Example 1.

Modified Example 1

(1) Solution to Problem 1

As the solution to Problem 1, in the modified examples (Modified Examples 1 to 5), a base station 10 transmits a value tag for each SIB which is not periodically broadcasted among system information (for example, an MIB, a SIB1, and a SIB2) which is normally periodically broadcasted. The system information which is periodically broadcasted may be referred to as broadcast information. A user equipment 20 receiving the value tag determines that the corresponding cell (that is, the base station 10) supports the function of the SIB of which the value tag is transmitted. On the contrary, the user equipment 20 determines that the corresponding cell does not support the function of the SIB of which the value tag is not transmitted.

Figure 9:
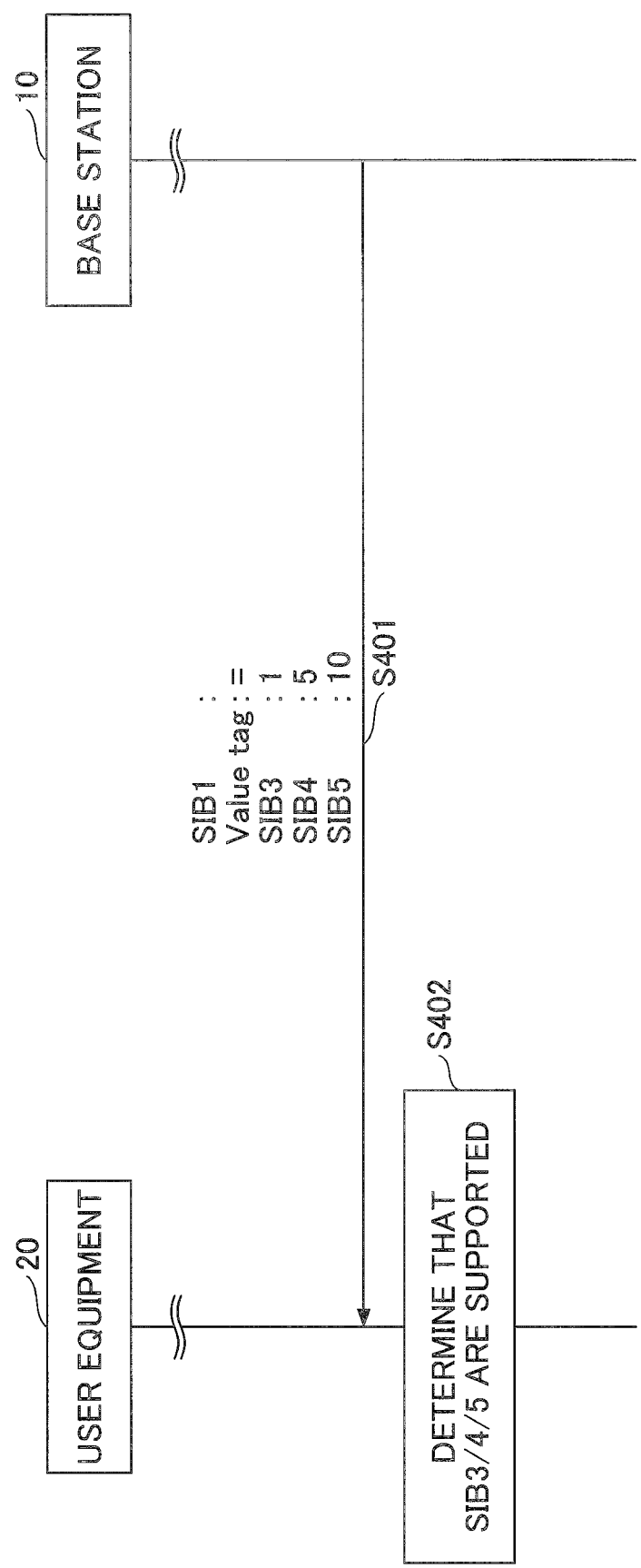
FIG. 9 is a sequence diagram in Modified Example 1.

A specific example of the above-mentioned procedure will be described below with reference to the sequence diagram illustrated in FIG. 9. As illustrated in FIG. 9, the base station 10 transmits (broadcasts) a SIB1 including 1 as a value of the value tag of a SIB3, including 5 as a value of the value tag of a SIB4, and including 10 as a value of the value tag of a SIB5 (Step S401).

The user equipment 20 receiving the SIB1 detects the value tags of the SIB3, the SIB4, and the SIB5 from the SIB1 and thus determines that the corresponding cell supports the SIB3, the SIB4, and the SIB5 (Step S402).

Figure 10:
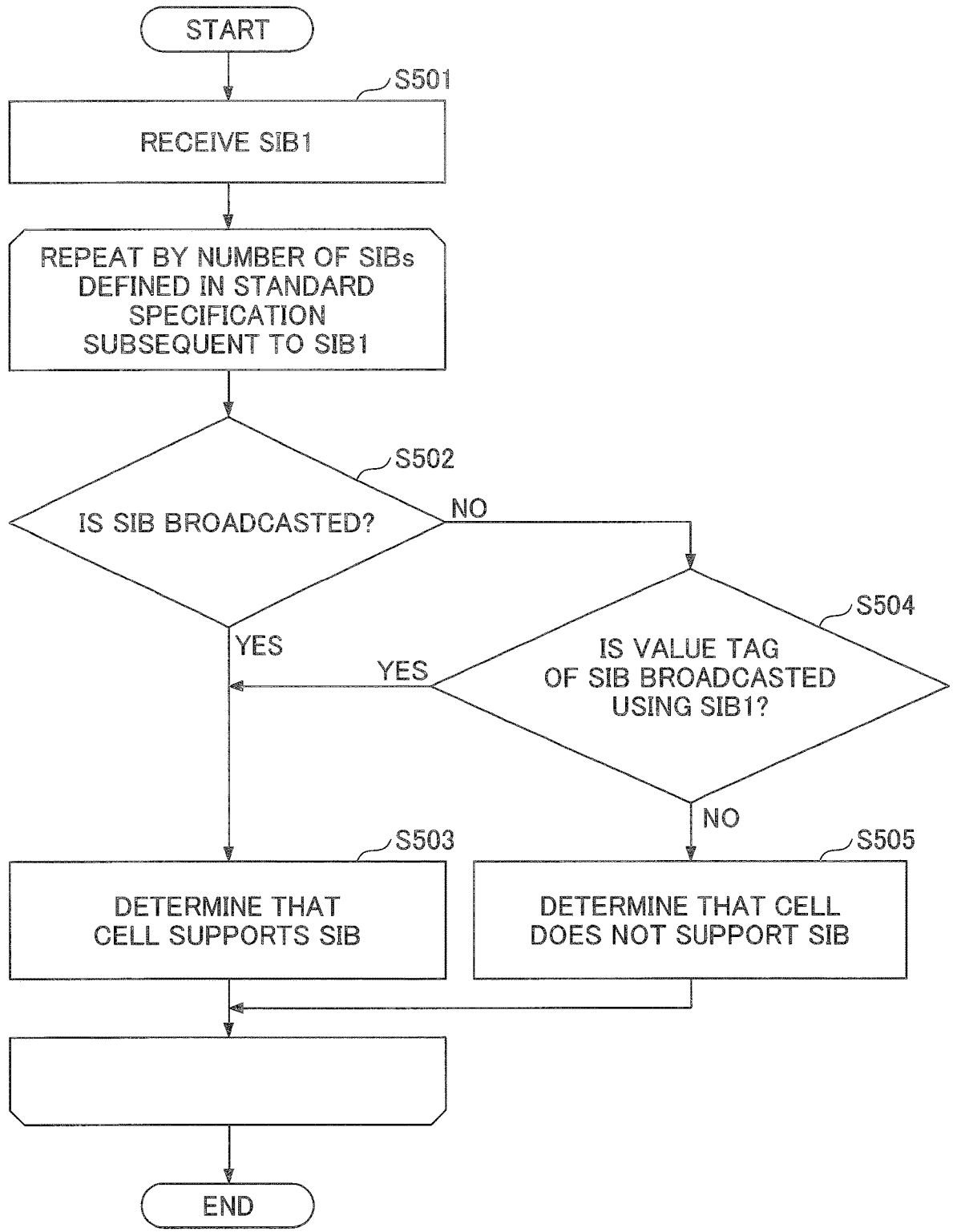
FIG. 10 is a flowchart illustrating an operation of a user equipment 20 in Modified Example 1.

FIG. 10 is a flowchart illustrating the operation of the user equipment 20 receiving a SIB1 in more detail. An example of the operation of the user equipment 20 receiving the SIB1 will be described below with reference to FIG. 10.

When the user equipment 20 receives the SIB1 (Step S501), the processes of Steps S502 to S505 are repeatedly performed by a predetermined number of SIBs subsequent to the SIB1 in accordance with the procedure of the flowchart. In the example illustrated in FIG. 10, the predetermined number of SIBs is the number of SIBs which is defined in a standard specification, but is not limited thereto.

In Step S502, the user equipment 20 determines whether a target SIB is broadcast. That is, the user equipment 20 determines whether to receive a target SIB. When the target SIB is broadcast (YES in Step S502), the user equipment 20 determines that the cell supports the SIB (Step S503).

When the target SIB is not broadcast (NO in Step S502), the user equipment 20 determines whether the value tag of the SIB is broadcast using the SIB1 (Step S504). When it is determined that the value tag of the SIB is broadcast using the SIB1 (YES in Step S504), the user equipment 20 determines that the cell supports the SIB (Step S503). When it is determined that the value tag of the SIB is not broadcast using the SIB1 (NO in Step S504), the user equipment 20 determines that the cell does not support the SIB (Step S505).

As the solution to Problem 1, a method using information other than the value tag may be employed in addition to the method using the value tag as described above. In this method, separately from the value tag, for example, the base station 10 includes information such as a bitmap indicating supported SIB(s) in the cell in system information (for example, the MIB, the SIB1, or the SIB2) which is periodically broadcast. The user equipment 20 receiving the system information determines the SIB(s) which is supported by the cell on the basis of the information such as the bitmap.

For example, a bitmap of 32 bits is defined and the bits are correlated with the SIBs. For example, it is thought that a SIB number and a bit position are correlated with each other such as correlating the MSB with the SIB1 and correlating the second bit (the second MSB) with the SIB2. Regarding the relationship between a bit value and correlation/non-correlation, for example, it may be defined that a bit of "1" means correlation and a bit of "0" means non-correlation (the reverse may be defined). In this case, for example, the user equipment 20 can determine that the cell supports the SIB1 when the MSB is 1 and that the cell does not support the SIB1 when the MSB is 0.

(2) Solution to Problem 2

In Modified Example 1, the user equipment 20 determines a supported SIB by the above-mentioned method and then requests a SIB(s) which it is necessary to individually transmit to the base station 10 using an RRC connection request message in an RRC connection establishment procedure. Alternatively, the user equipment 20 may request a SIB(s) which it is necessary to individually transmit to the base station 10 using an RRC connection setup complete message. Thereafter, the base station 10 individually transmits the requested SIB(s) to the user equipment 20 using an RRC connection reconfiguration procedure. When the user equipment 20 requests the SIB(s) using an RRC connection request message, the base station 10 may transmit the SIB(s) using an RRC connection setup message.

The user equipment may perform request of SIB(s) and reception of SIB(s) by applying any one of the after-mentioned detailed examples 1-5 for SIB request method. Note that the after-mentioned detailed examples 1-5 for SIB request method can be applied even when the solution for the problem 1 is not performed.

Figure 11:
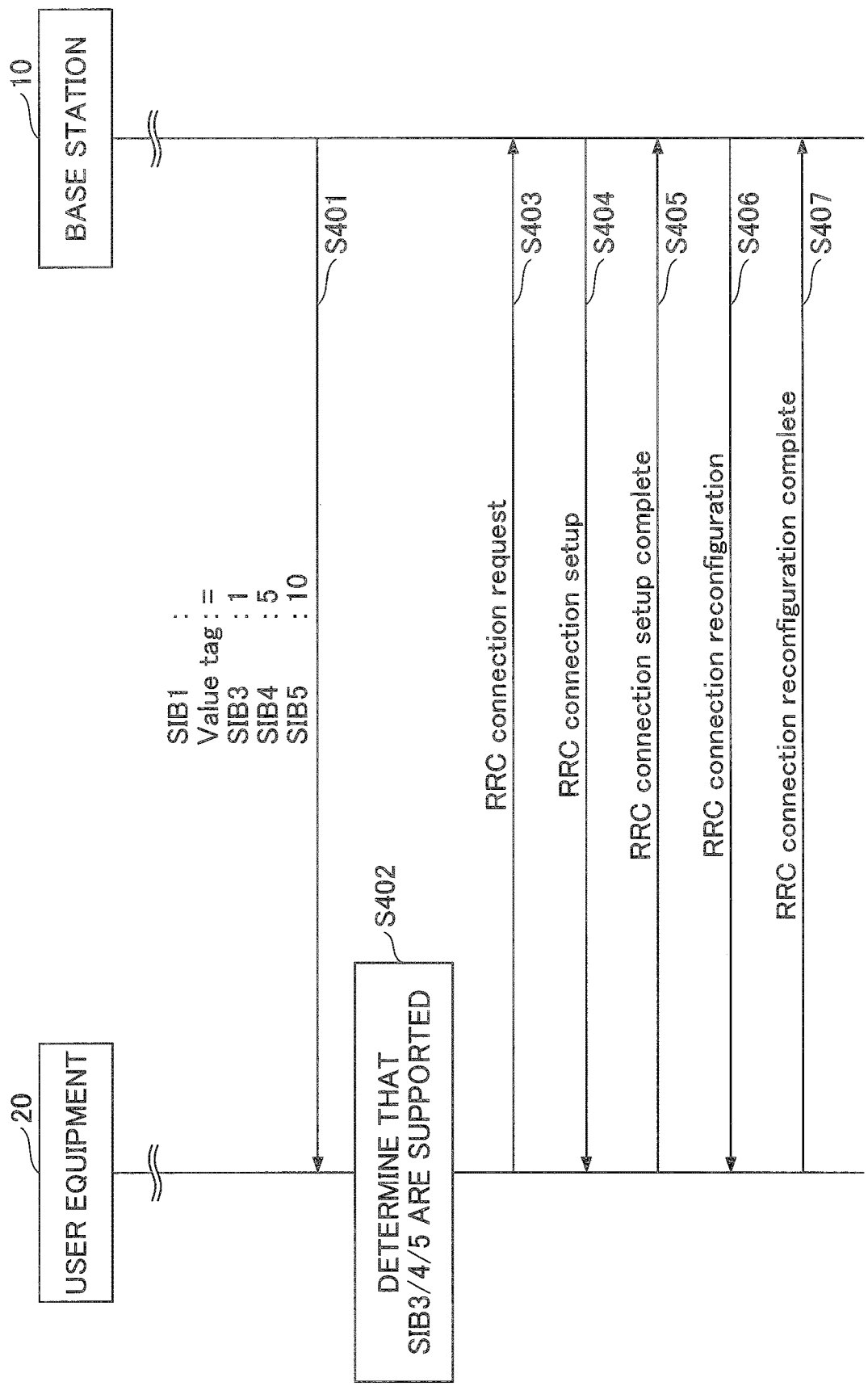
FIG. 11 is a sequence diagram in Modified Example 1.

An operation example associated with the solution to Problem 2 in Modified Example 1 will be described below with reference to the sequence diagram illustrated in FIG. 11.

By Steps S401 and S402 which have been described above, the user equipment 20 determines that the SIB3, the SIB4, and the SIB5 are supported in the corresponding cell.

When the user equipment 20 transmits an RRC connection request message to the base station 10 for setup of connection to the base station 10 (Step S403), an RRC connection setup message is transmitted from the base station 10 to the user equipment 20 (Step S404). Subsequently, the user equipment 20 transmits an RRC connection setup complete message to the base station 10 (Step S405), and the base station 10 transmits an RRC connection reconfiguration message to the user equipment 20 (Step S406). Then, the user equipment 20 transmits an RRC connection reconfiguration complete message to the base station 10 (Step S407).

In the above-mentioned procedure, the user equipment 20 requests the base station 10 to transmit the SIB3, the SIB4, and the SIB5 in Step S403 (the RRC connection request message). In this case, the base station 10 individually transmits the SIB3, the SIB4, and the SIB5 to the user equipment 20 in Step S404 (the RRC connection setup message) or Step S406 (the RRC connection reconfiguration message).

The user equipment 20 may request the base station 10 to transmit the SIB3, the SIB4, and the SIB5 in Step S405 (the RRC connection setup complete message). In this case, the base station 10 individually transmits the SIB3, the SIB4, and the SIB5 to the user equipment 20 in Step S406 (the RRC connection reconfiguration message).

Modified Example 2

In Modified Example 2, the user equipment 20 determines a supported SIB by the solution to Problem 1 described in Modified Example 1 and then requests a SIB(s) which it is necessary to individually transmit to the base station 10 using an RRC connection resume request message in an RRC connection resume procedure. Alternatively, the user equipment 20 may request a SIB(s) which it is necessary to individually transmit to the base station 10 using an RRC connection resume complete message. Thereafter, the base station 10 individually transmits the requested SIB(s) to the user equipment 20 using an RRC connection reconfiguration procedure. When the user equipment 20 requests the SIB(s) using an RRC connection resume request message, the base station 10 may transmit the SIB(s) using an RRC connection resume message.

Figure 12:
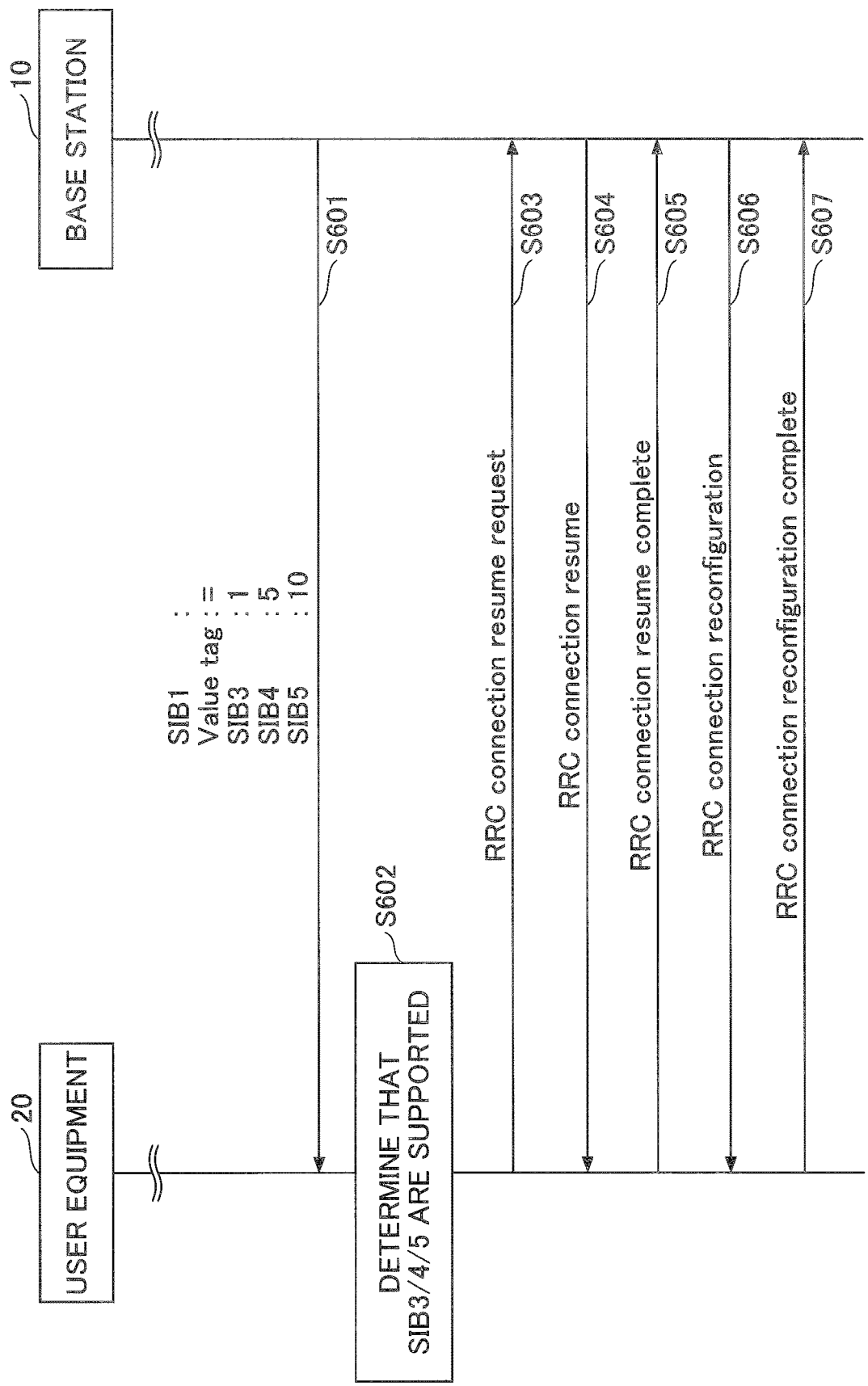
FIG. 12 is a sequence diagram in Modified Example 2.

An operation example in Modified Example 2 will be described below with reference to the sequence diagram illustrated in FIG. 12.

By Steps S601 and S602, the user equipment 20 determines that the SIB3, the SIB4, and the SIB5 are supported in the corresponding cell.

When the user equipment 20 transmits an RRC connection resume request message to the base station 10 for resume of connection to the base station 10 (Step S603), an RRC connection resume message is transmitted from the base station 10 to the user equipment 20 (Step S604). Subsequently, the user equipment 20 transmits an RRC connection resume complete message to the base station 10 (Step S605), and the base station 10 transmits an RRC connection reconfiguration message to the user equipment 20 (Step S606). Then, the user equipment 20 transmits an RRC connection reconfiguration complete message to the base station 10 (Step S607).

In the above-mentioned procedure, the user equipment 20 requests the base station 10 to transmit the SIB3, the SIB4, and the SIB5 in Step S603 (the RRC connection resume request message). In this case, the base station 10 individually transmits the SIB3, the SIB4, and the SIB5 to the user equipment 20 in Step S604 (the RRC connection resume message) or Step S606 (the RRC connection reconfiguration message).

The user equipment 20 may request the base station 10 to transmit the SIB3, the SIB4, and the SIB5 in Step S605 (the RRC connection resume complete message). In this case, the base station 10 individually transmits the SIB3, the SIB4, and the SIB5 to the user equipment 20 in Step S606 (the RRC connection reconfiguration message).

Modified Example 3

In Modified Example 3, the user equipment 20 determines a supported SIB by the solution to Problem 1 described in Modified Example 1 and then requests a SIB(s) which it is necessary to individually transmit to the base station 10 using a UE capability information message in a UE capability transfer procedure after the RRC connection establishment procedure is completed. Thereafter, the base station 10 individually transmits the requested SIB(s) to the user equipment 20 using an RRC connection reconfiguration procedure.

Figure 13:
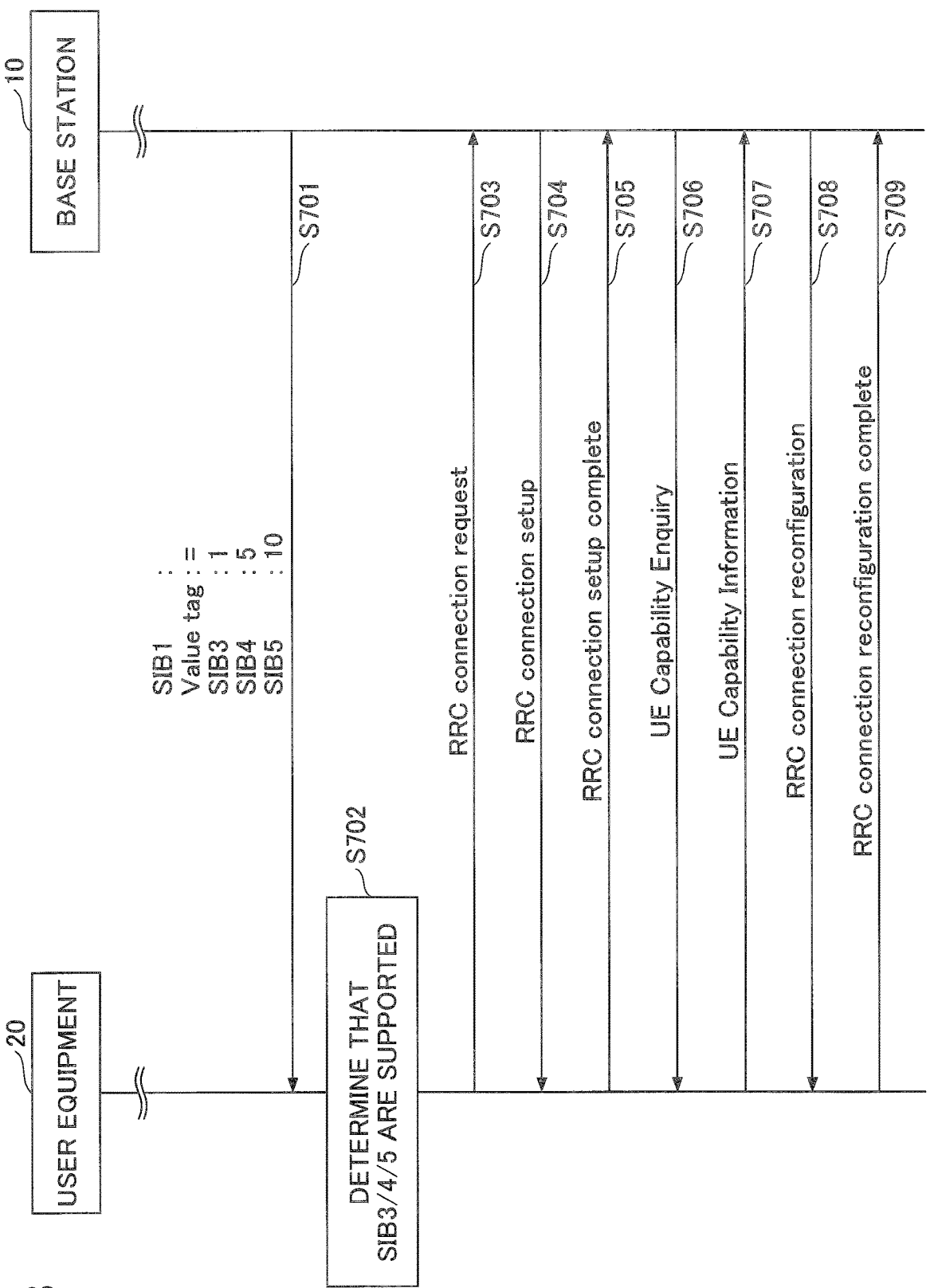
FIG. 13 is a sequence diagram in Modified Example 3.

An operation example in Modified Example 3 will be described below with reference to the sequence diagram illustrated in FIG. 13.

By Steps S701 and S702, the user equipment 20 determines that the SIB3, the SIB4, and the SIB5 are supported in the corresponding cell.

When the user equipment 20 transmits an RRC connection request message to the base station 10 for setup of connection to the base station 10 (Step S703), an RRC connection setup message is transmitted from the base station 10 to the user equipment 20 (Step S704). Subsequently, the user equipment 20 transmits an RRC connection setup complete message to the base station 10 (Step S705), and the base station 10 transmits a UE capability enquiry message to the user equipment 20 (Step S706). Then, the user equipment 20 transmits a UE capability information message to the base station 10 (Step S707).

The base station 10 transmits an RRC connection reconfiguration message to the user equipment 20 (Step S708), and the user equipment 20 transmits an RRC connection reconfiguration complete message to the base station 10 (Step S709).

In the above-mentioned procedure, the user equipment 20 requests the base station 10 to transmit the SIB3, the SIB4, and the SIB5 in Step S707 (the UE capability information message). In this case, the base station 10 individually transmits the SIB3, the SIB4, and the SIB5 to the user equipment 20 in Step S709 (the RRC connection reconfiguration message).

Modified Example 4

In Modified Example 4, the user equipment 20 uses a new procedure for individually acquiring system information. The user equipment 20 determines a supported SIB by the solution to Problem 1 described in Modified Example 1, requests a SIB(s) which it is necessary to individually transmit to the base station 10 using the new procedure before or after the RRC connection establishment procedure is completed, and receives the requested SIB(s) from the base station 10.

Hereinafter, a case in which the new procedure is used before the RRC connection establishment procedure is completed will be described in Modified Example 4-1 and a case in which the new procedure is used after the RRC connection establishment procedure is completed will be described in Modified Example 4-2.

Modified Example 4-1

Figure 14:
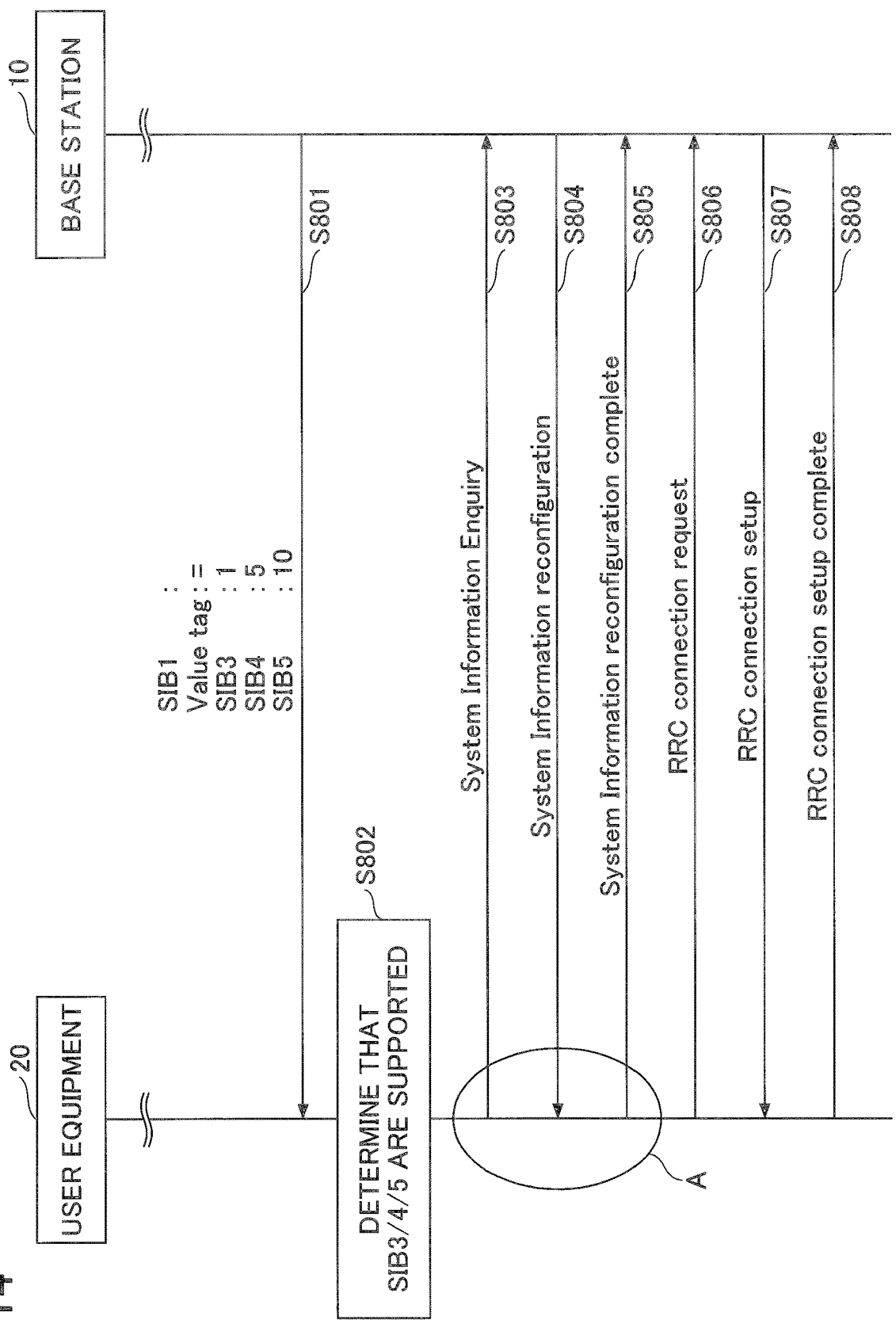
FIG. 14 is a sequence diagram in Modified Example 4-1.

An operation example in Modified Example 4-1 will be described below with reference to the sequence diagram illustrated in FIG. 14.

By Steps S801 and S802, the user equipment 20 determines that the SIB3, the SIB4, and the SIB5 are supported in the corresponding cell. Steps S803 to S805 indicated by A in FIG. 14 constitutes the new procedure.

When the user equipment 20 transmits a system information Enquiry for requesting transmission of the SIB3, the SIB4, and the SIB5 to the base station 10 (Step S803), a system information reconfiguration is transmitted from the base station 10 to the user equipment 20 (Step S804). When setting (storage) of the SIB3, the SIB4, and the SIB5 is completed, the user equipment 20 transmits a system information reconfiguration complete to the base station 10 (Step S805).

Thereafter, the RRC connection is established by Steps S806 to S808.

Modified Example 4-2

Figure 15:
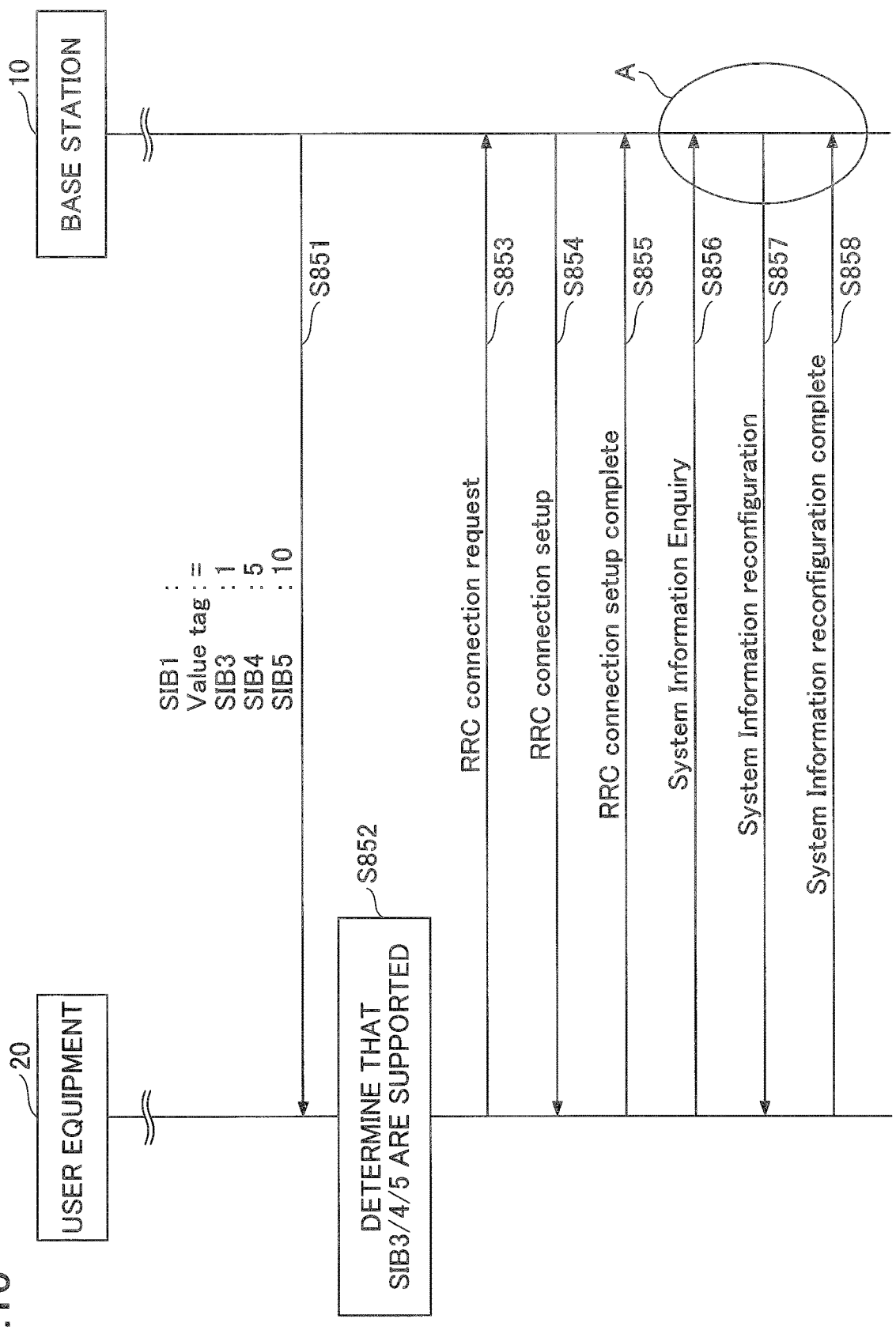
FIG. 15 is a sequence diagram in Modified Example 4-2.

An operation example in Modified Example 4-2 will be described below with reference to the sequence diagram illustrated in FIG. 15.

By Steps S851 and S852, the user equipment 20 determines that the SIB3, the SIB4, and the SIB5 are supported in the corresponding cell. Steps S856 to S858 indicated by A in FIG. 15 constitutes the new procedure.

The RRC connection is established by Steps S853 to S855. Thereafter, when the user equipment 20 transmits a system information enquiry for requesting transmission of the SIB3, the SIB4, and the SIB5 to the base station 10 (Step S856), system information reconfiguration including the SIB3, the SIB4, and the SIB5 is transmitted from the base station 10 to the user equipment 20 (Step S857). When setting (storage) of the SIB3, the SIB4, and the SIB5 is completed, the user equipment 20 transmits a system information reconfiguration complete to the base station 10 (Step S858).

Modified Example 5

In Modified Example 5, the user equipment 20 determines a supported SIB by the solution to Problem 1 described in Modified Example 1 and then requests a SIB(s) which it is necessary to individually transmit to the user equipment 20 to the base station 10 using an RA preamble before the RRC connection establishment procedure is performed. Thereafter, the base station 10 individually transmits the requested SIB(s) to the user equipment 20 using a random access response.

For example, an RA preamble sequence for requesting a specific SIB(s) is reserved in the corresponding cell (that is, the base station 10) and the user equipment 20 transmits an RA preamble corresponding to the requested SIB(s).

For example, in the case of LTE, 64 preamble sequences per cell are set such that a first sequence is set for the SIB3, a second sequence is set for the SIB4, a third sequence is set for the SIB5, a fourth sequence is set for the SIB3+SIB4, . . . . Mapping information on the SIB which is requested using the preamble sequences are transmitted to the user equipment 10, for example, using the system information (for example, the SIB1) which is periodically broadcasted from the base station 10. As to the method for requesting SIB(s) by Ra preamble, more detailed examples are described later as detailed examples of SIB request method.

Figure 16:
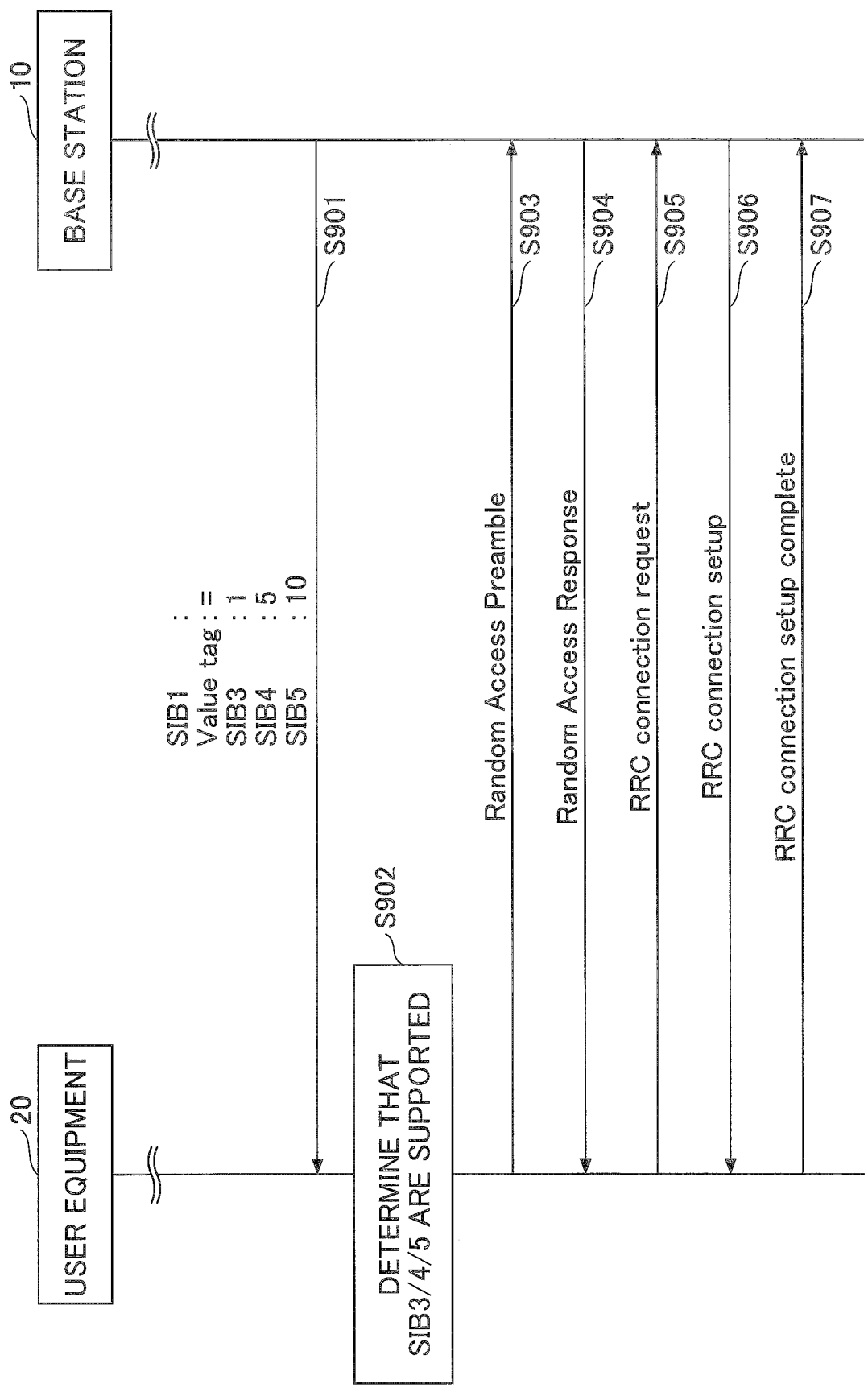
FIG. 16 is a sequence diagram in Modified Example 5.

An operation example in Modified Example 5 will be described below with reference to the sequence diagram illustrated in FIG. 16.

By Steps S901 and S902, the user equipment 20 determines that the SIB3, the SIB4, and the SIB5 are supported in the corresponding cell.

When the user equipment 20 transmits a random access preamble for requesting transmission of the SIB3, the SIB4, and the SIB5 to the base station 10 (Step S903), a random access response including the SIB3, the SIB4, and the SIB5 is transmitted from the base station 10 to the user equipment 20 (Step S904). Thereafter, the RRC connection is established by Steps S905 to S907.

(Detailed Example of SIB Request Method)

Next, a detailed example of a method by which the user equipment 20 requests system information to the base station 10 will be described. As in the description so far, in the specification, the system information related to the request is referred to as a SIB for convenience. Each SIB request method described in the "Detailed example of SIB request method" can be applied to any SIB request step in the present embodiment as long as there is no inconsistency.

Figure 17:
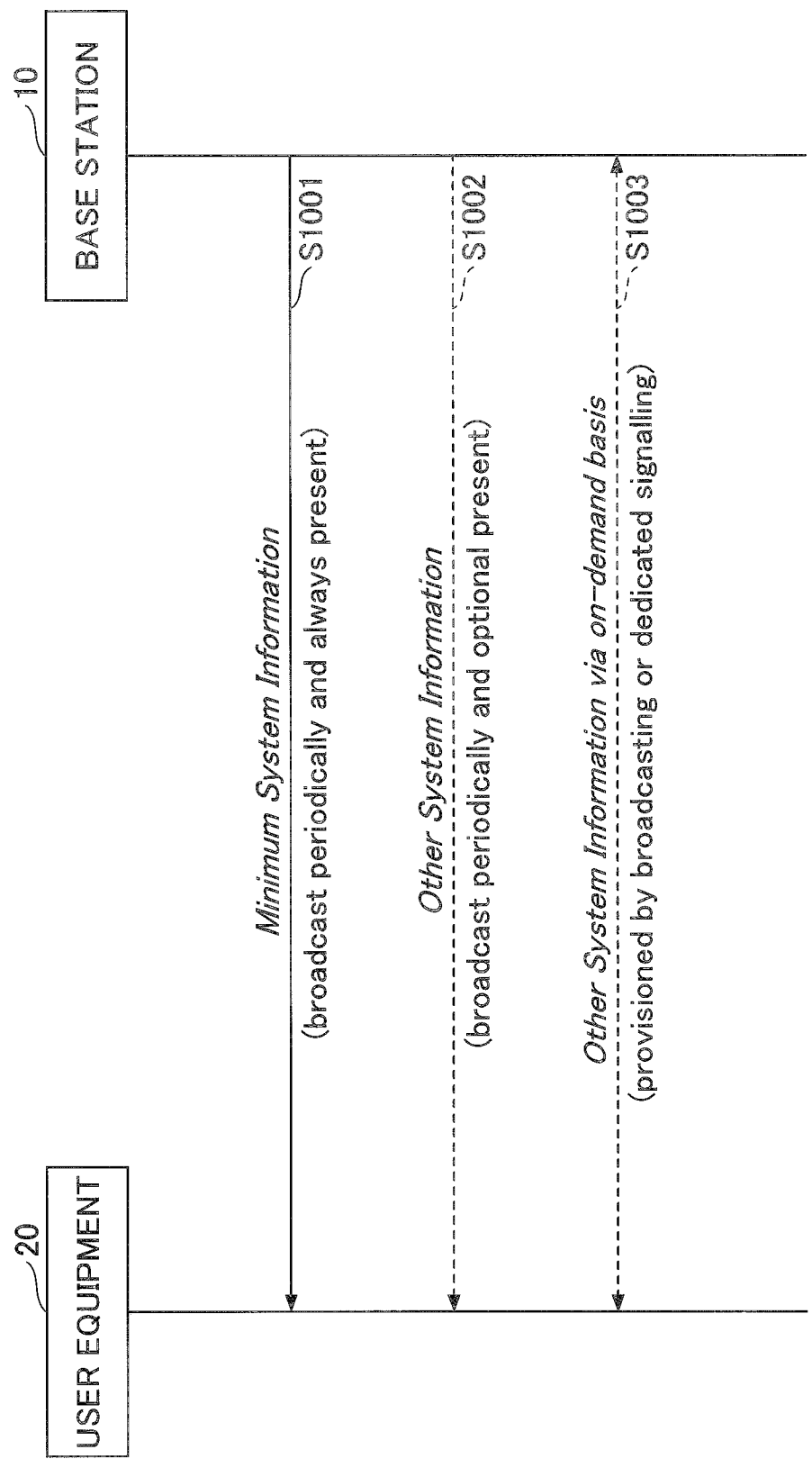
FIG. 17 is a diagram showing a basic process sequence for SIB request method.

FIG. 17 shows a basic processing sequence relating to the SIB request. As shown in FIG. 17, minimum system information (Minimum System Information) is transmitted from the base station 10, and the user equipment 20 receives the minimum system information (step S1001). The minimum system information is system information that is always periodically broadcast from the base station 10. Optional system information may be periodically broadcast from the base station 10 (step S1002).

In step S1003, the base station 10 transmits a SIB (other system information via on-demand basis) as other system information based on a request from the user equipment 20. As described above, the SIB is transmitted from the base station 10 to the user equipment 20 by broadcasting or dedicated signaling.

The user equipment 20 in FIG. 17 is in an RCC_CONNECTED state, an RRC_INACTIVE state, or an RRC_IDLE state.

Figure 18:
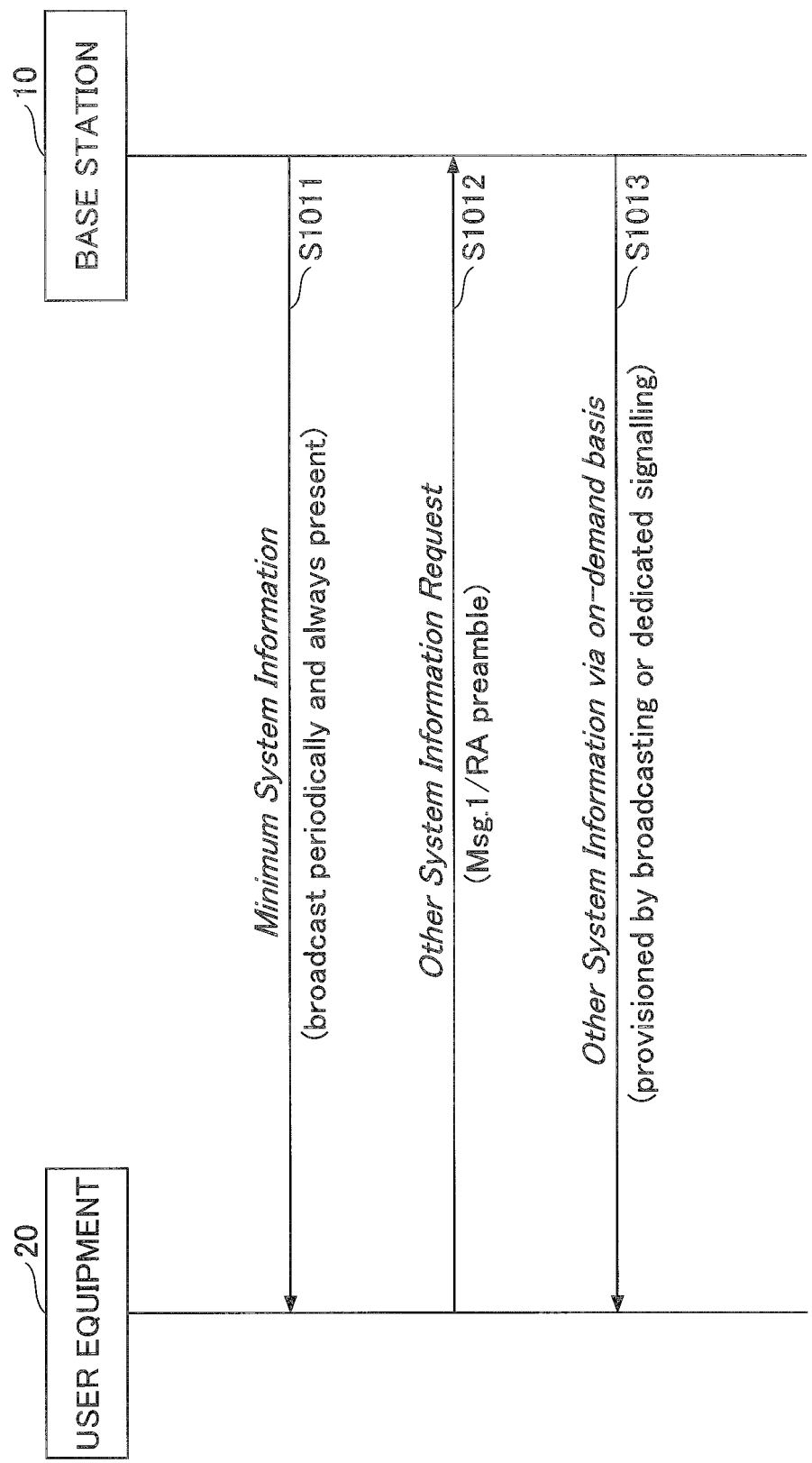
FIG. 18 is a diagram for explaining a detailed example 1 of SIB request method.
Figure 19:
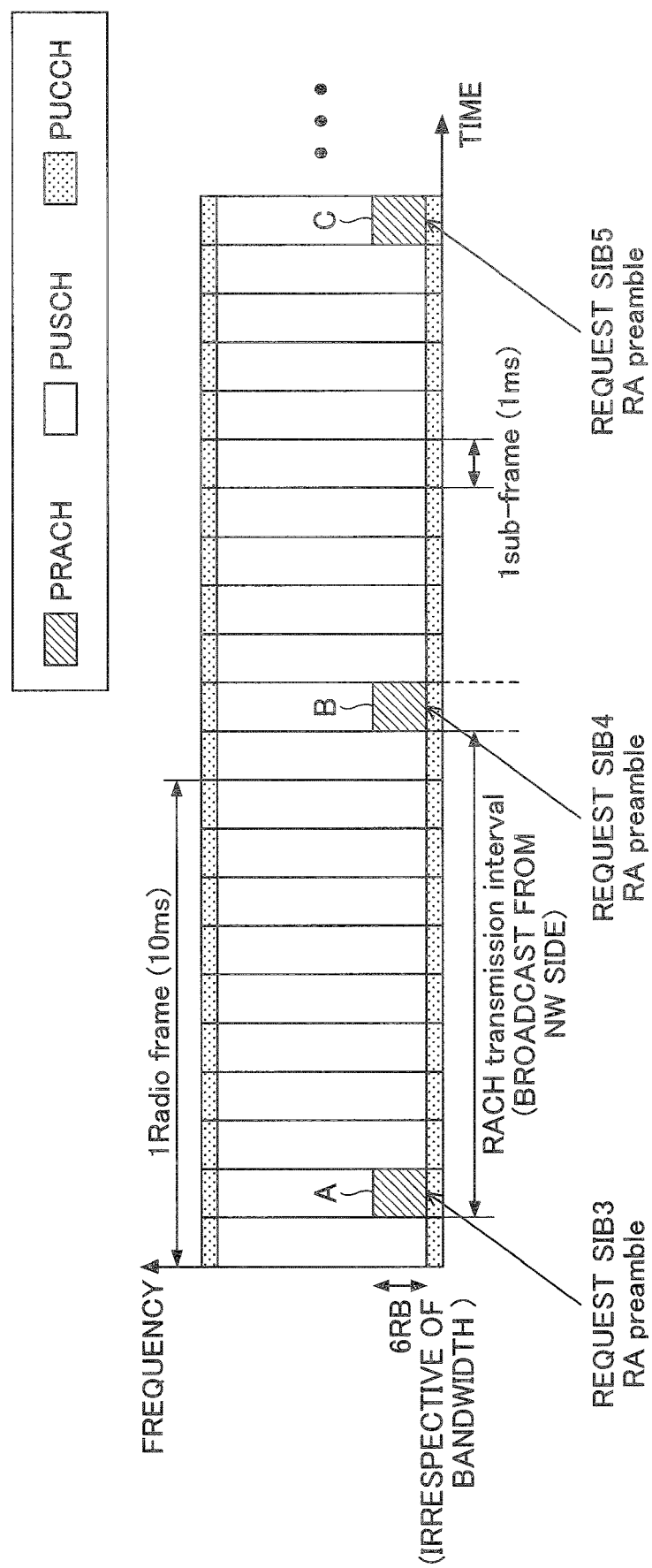
FIG. 19 is a diagram for explaining a detailed example 1 of SIB request method.
Figure 20:
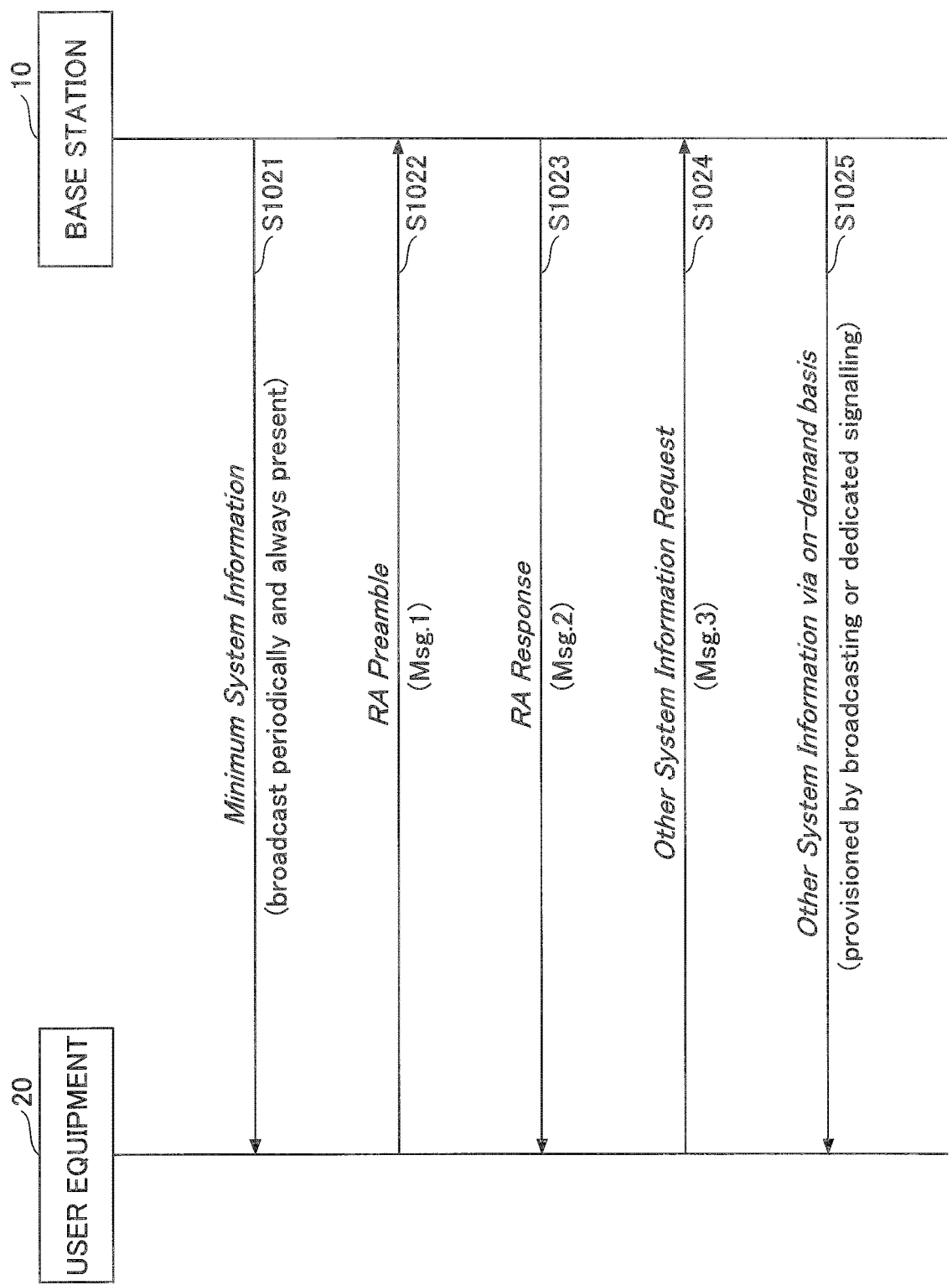
FIG. 20 is a diagram for explaining a detailed example 2 of SIB request method.

For example, there are examples shown in FIGS. 18 and 19 and examples shown in FIG. 20 as an example of a process in which the user equipment 20 in the RRC_IDLE state or the INACTIVE state requests and acquires the SIB (s) from the base station 10. An example shown in FIGS. 18 and 19 and an example shown in FIG. 20 will be described as detailed example 1 of SIB request method and detailed example 2 of SIB request method, respectively.

<Detailed Example 1 of SIB Request Method>

In the example shown in FIG. 18, in step S1012, the user equipment 20 transmits a request for SIB(s) (Other System Information Request) to the base station 10 by a message 1 (RA preamble) in a random access procedure. In step S1013, the base station 10 transmits the requested SIB(s) to the user equipment 20 by broadcasting or dedicated signaling.

As in the example shown in FIG. 18, when SIB(s) is requested using only the RA preamble, the RA preamble is associated with the requested SIB. Association may be made like, for example, Preamble #1=SIB1, Preamble #2=SIB2, Preamble #3=SIB1+SIB 2 . . . . Thereby, the base station 10 can grasp the requested SIB(s) by the RA preamble to be received.

However, with the above method, a large number of RA preamble sequences are required. For example, in Rel-13 LTE, 20 SIBs from SIB1 to SIB20 are specified. In this case, considering all combinations requesting 1 to 20 SIBs out of 20 SIBs, $_{20}C_1+_{20}C_2+\ldots+_{20}C_{20}=1048575$ RA preambles are needed. In LTE, the number of RA preambles per one cell is 64, so it is impossible to make SIB request considering the above combinations as it is.

Alternatively, the user equipment 20 may request only one SIB using one RA preamble. When the user equipment 20 requests a plurality of SIBs, the RACH transmission timing is divided for each request SIB, and one SIB is requested at each RACH transmission timing. An example of processing in this case is shown in FIG. 19. FIG. 19 uses PRACH locations of LTE as an example. As shown in FIG. 19, the user equipment 20 transmits a RA preamble requesting SIB3 at a RACH transmission timing indicated by A, transmits a RA preamble requesting SIB4 at a RACH transmission timing indicated by B, and transmits a RA preamble requesting SIB5 at a RACH transmission timing indicated by C. In this example, since the user equipment 20 transmits three RA preambles at different times, it takes 20 ms to request the three SIBs of SIB3, SIB4, and SIB5.

<Detailed Example 2 of SIB Request Method>

In the example shown in FIG. 20, after transmitting and receiving RA preamble and RA response (S1022, S1023), in step S1024, the user equipment 20 transmits a request of SIB(S) (Other System Information Request) to the base station 10 using a message 3 (e.g., RRC message or MAC CE) in a random access procedure. In step S1025, the base station 10 transmits the requested SIB(s) to the user equipment 20 by broadcasting or dedicated signaling.

As in the example shown in FIG. 20, when requesting the SIB using the message 3, the user equipment 20 transmits an RRC message including information of the SIB to request or a MAC CE (MAC Control Element) including information of the SIB to request using a PUSCH (Physical Uplink Shared Channel). The information of the SIB to request is, for example, a bitmap of 20 bit length. It is informed which SIB is requested by on/off of each bit of the bitmap. In the case of using the message 3, the processing load of the base station 10 increases, and more resources may be required for Msg. 2/3.

In this embodiment, it is possible to use either the method of using only the RA preamble (example: the method shown in FIG. 19) or the method using the message 3 as the SIB request method. However, as described above, there is a possibility that it takes time to acquire the SIB or the processing load is increased. In the following, as an example of SIB request methods that solve these problems, detailed example 3 of SIB request method to detailed example 5 of SIB request method will be described.

<Detailed Example 3 of SIB Request Method>

The overall processing procedure of the detailed example 3 of SIB request method is the same as the processing procedure of the detailed example 1 of SIB request method shown in FIG. 18. However, in the detailed example 3 of SIB request method, the SIB request signal transmitted from the user equipment 20 in step S1012 of FIG. 18 is different from the signal in the detailed example 1 of SIB request method.

Figure 21:
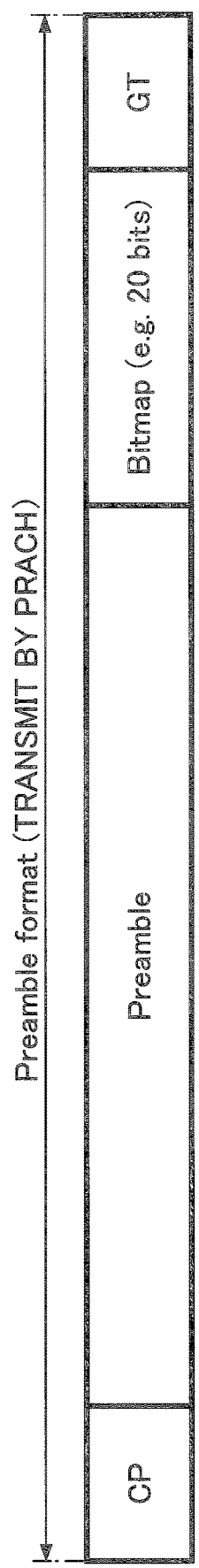
FIG. 21 is a diagram for explaining a detailed example 3 of SIB request method.

In the detailed example 3 of SIB request method, in step S1012 of FIG. 18, the user equipment 20 transmits a message of the preamble format shown in FIG. 21 to the base station 10 by a PRACH (Physical Random Access Channel). The preamble format shown in FIG. 21 is a format in which GT (Guard Time) and CP are added to a sequence that is obtained by adding a bitmap indicating presence or absence of a SIB request to the RA preamble. The bitmap is, for example, 20 bits, and a requested SIB is designated by on/off of each bit.

By making a SIB request using the preamble format shown in FIG. 21, it is possible to quickly acquire many SIB(s).

<Detailed Example 4 of SIB Request Method>

Figure 22:
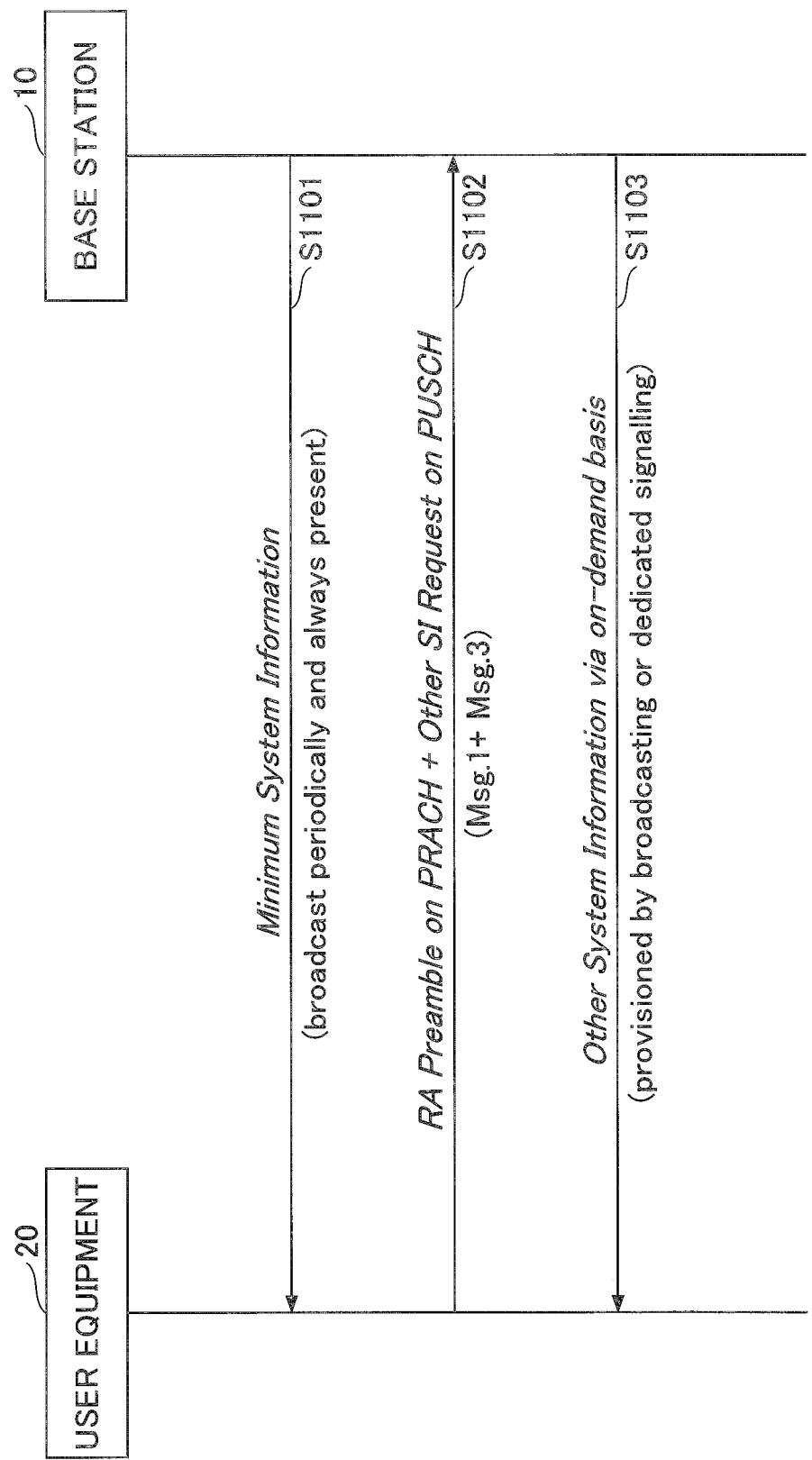
FIG. 22 is a diagram for explaining a detailed example 4 of SIB request method.

FIG. 22 is a diagram showing a processing procedure in the detailed example 4 of SIB request method. After receiving the minimum system information (step S1101), the user equipment 20 transmits a message (RRC message or MAC CE) including a bitmap indicating the requested SIB(s), and a RA preamble in the same TTI (Transmission Time Interval) (step S1102). 1 TTI is, for example, one subframe. 1 TTI may be one slot. The RA preamble in step S1102 is transmitted by a PRACH, and the message including a bitmap is transmitted by a PUSCH.

Regarding the PUSCH resource for message transmission, for example, another frequency resource in the same time domain (TTI) in which the RA preamble is transmitted is pre-allocated for PUSCH. The user equipment 20 transmits the message having the bitmap by using the resource on the PUSCH. The RA preamble includes identification information for identifying the user equipment 20. Alternatively, the transmission resource of the RA preamble may be identification information for identifying the user equipment 20.

The bitmap included in the message is the same as the bitmap described so far, and the request SIB is designated by on/off of each bit.

In step S1103, the SIB(s) requested by the message having the bitmap is transmitted from the base station 10 to the user equipment 20. The base station 10 can transmit the requested SIB(s) to the user equipment 20 using the identification information of the user equipment 20 included in the RA preamble (or the RA preamble transmission resource) received in step S1102.

As described above, it is possible to quickly acquire many SIB(s) by transmitting a RA preamble and a message having a bitmap in 1 TTI.

<Detailed Example 5 of SIB Request Method>

Figure 23:
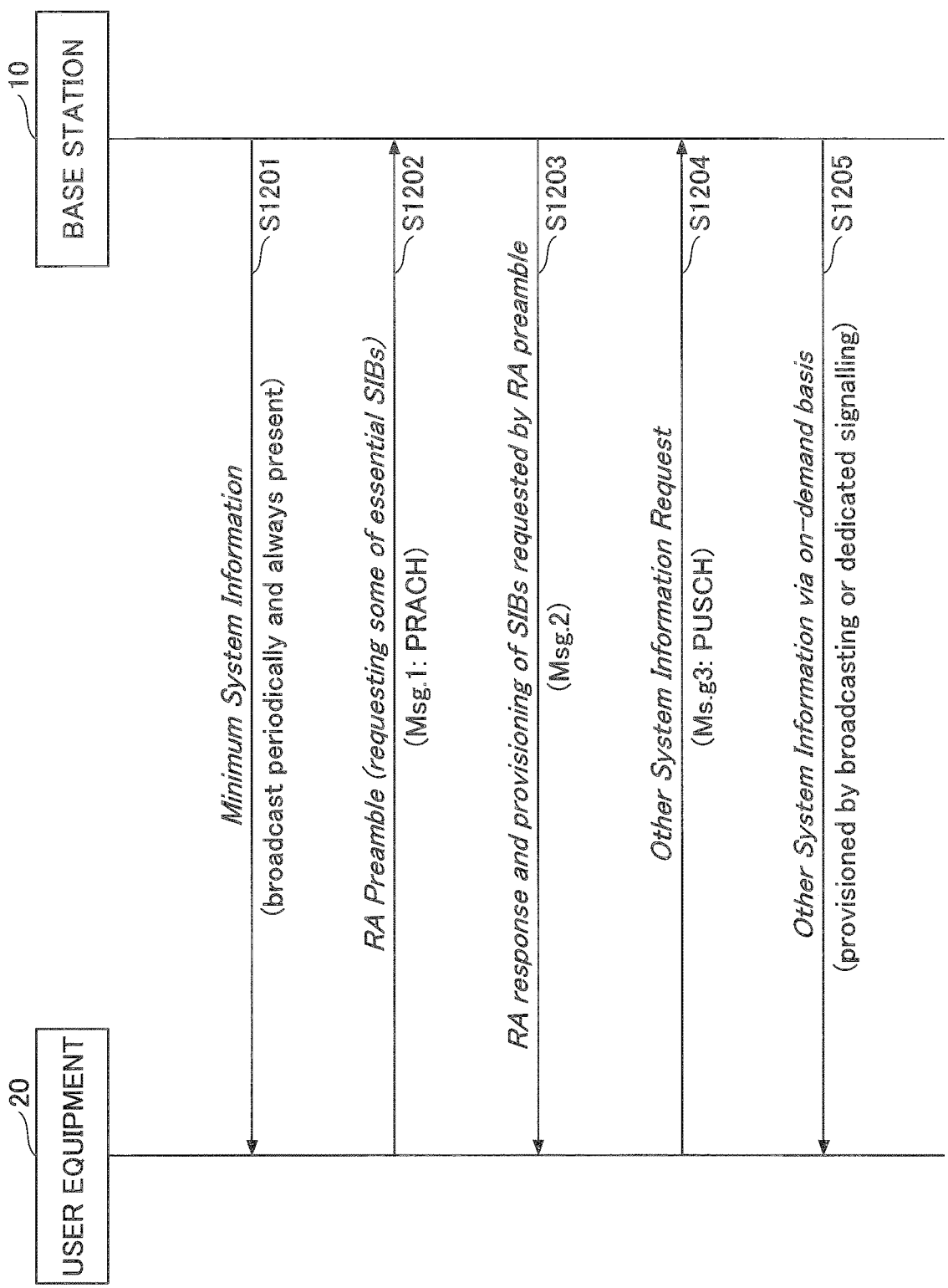
FIG. 23 is a diagram for explaining a detailed example 5 of SIB request method.

FIG. 23 is a diagram showing a processing procedure in the detailed example 5 of SIB request method. After receiving the minimum system information (step S1201), the user equipment 20 requests a part of SIB(s) of all the SIBs(s) to request using a RA preamble (step S1202). In the request of SIB in step S1202, as described in the detailed example 1 of SIB request method, a method of associating RA preamble with SIB is used. Alternatively, as described in the detail example 3 of SIB request method, SIB(s) may be requested with a bitmap using the preamble format shown in FIG. 21.

In step S1203, the base station 10 transmits a RA response, and at the same time transmits the SIB (s) requested by the RA preamble in step S1202. The user equipment 20 receives the RA response and the SIB(s) requested by the RA preamble from the base station 10.

In step S1204, the user equipment 20 transmits a message 3 (RRC message or MAC CE) including a bitmap specifying the remaining SIB (s) to be requested to the base station 10. The bitmap is the same as the bitmap explained so far, and the requested SIB is designated by on/off of each bit.

In step S1205, the user equipment 20 receives the SIB(s) requested by the message 3 from the base station 10.

For example, taking SIBs of LTE as an example, the user equipment 20 requests SIB2 to SIB5 necessary for cell reselection in the LTE using the RA preamble, and the user equipment 20 requests SIBs following SIB6 using the bitmap of the message 3. If the method of associating RA preamble with SIB is used in the SIB request by RA preamble, the number of required RA preambles is $_4C_1+_4C_2+_4C_3+_4C_4=15$, which is a very small number compared with the case where SIB is requested using only RA preamble.

While various examples in the embodiment and the modified examples and detailed examples of SIB request method have been described above, the examples can be carried out in combination.

(Device Configuration)

An example of configurations of the base station 10, the user equipment 20, and the control device 40 according to the embodiment of the invention will be described below.

<Base Station 10>

Figure 24:
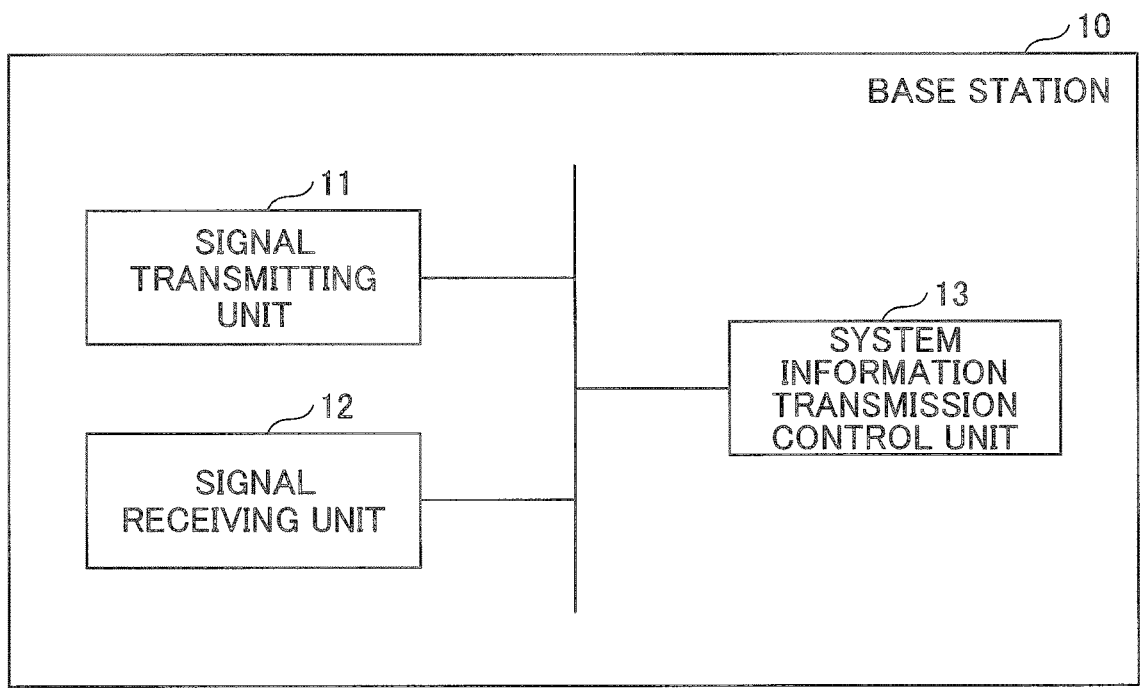
FIG. 24 is a diagram illustrating a configuration of a base station 10.

FIG. 24 illustrates a functional configuration diagram of a base station 10. As illustrated in FIG. 24, the base station 10 includes a signal transmitting unit 11, a signal receiving unit 12, and a system information transmission control unit 13.

The signal transmitting unit 11 has a function of generating various signals of a physical layer from information of an upper layer to be transmitted from the base station 10 and transmitting the generated signals. The signal receiving unit 12 has a function of receiving various uplink signals from a user equipment 20 and acquiring information of an upper layer from the received signals of the physical layer.

The system information transmission control unit 13 controls transmission of system information from the base station 10, which has been described in the embodiment and the modified examples and the detailed examples of SIB request method. For example, the system information transmission control unit 13 transmits a change message via the signal transmitting unit 11 when the system information is changed, and transmits a corresponding SIB to a user equipment 20 via the signal transmitting unit 11 when a SIB transmission request in which a specific SIB is designated is received from the user equipment 20 via the signal receiving unit 12. The system information transmission control unit 13 performs control of preparation/transmission of SIB difference information, control of transmission of an ID of a SIB common area, and the like. The system information transmission control unit 13 has a function of receiving and holding the ID of the SIB common area from the control device 40. As described above in the modified examples and the detailed examples of SIB request method, when a request for individual transmission of a specific SIB(s) is received from the user equipment 10 via the signal receiving unit 12, the system information transmission control unit 13 has a function of individually transmitting the requested SIB(s) via the signal transmitting unit 11. The system information transmission control unit 13 may be included in the signal transmitting unit 11 and/or the signal receiving unit 12.

The configuration of the base station 10 illustrated in FIG. 24 may be embodied by a hardware circuit (for example, one or more IC chips) as a whole, or some may be constituted by a hardware circuit and the other may be realized by a CPU, a memory, and a program.

<User Equipment 20>

Figure 25:
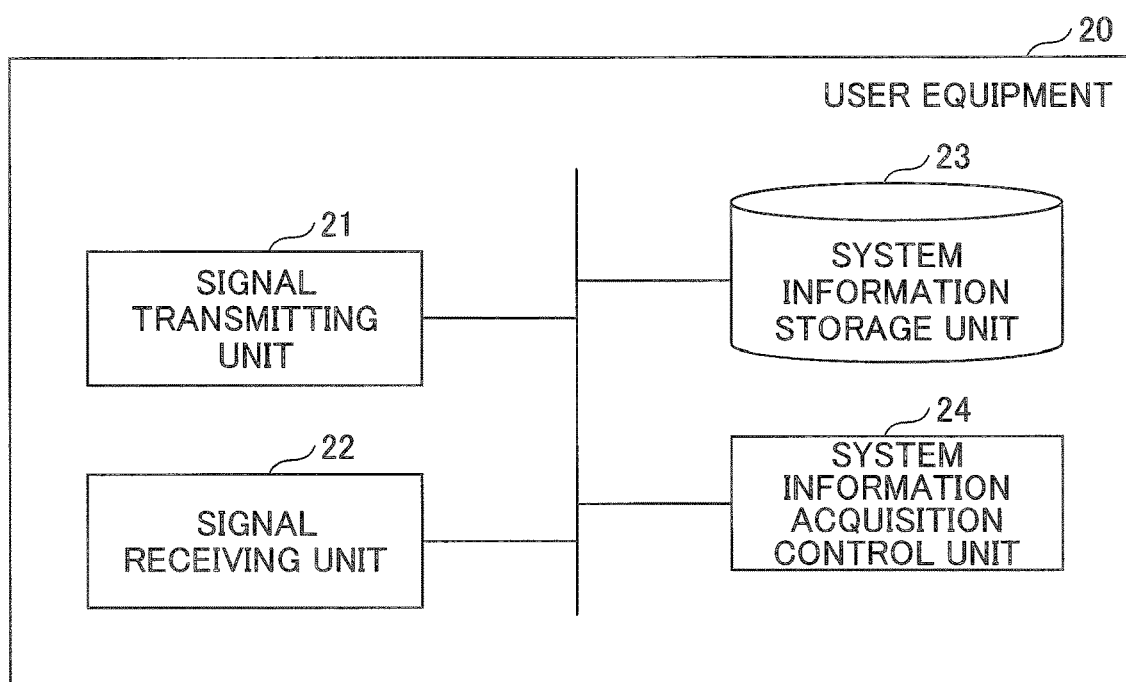
FIG. 25 is a diagram illustrating a configuration of a user equipment 20.

FIG. 25 illustrates a functional configuration diagram of a user equipment 20. As illustrated in FIG. 25, the user equipment 20 includes a signal transmitting unit 21, a signal receiving unit 22, a system information storage unit 23, and a system information acquisition control unit 24.

The signal transmitting unit 21 has a function of generating various signals of a physical layer from information of an upper layer to be transmitted from the user equipment 20 and transmitting the generated signals to the base station 10. The signal receiving unit 22 has a function of receiving various downlink signals from the base station 10 and acquiring information of an upper layer from the received signals of the physical layer.

The system information storage unit 23 stores system information received from the base station 10. For example, operations of transmitting and receiving a signal and the like are performed by the signal transmitting unit 21/the signal receiving unit 22 using a parameter in the stored system information.

The system information acquisition control unit 24 performs control associated with request/reception of system information, which has been described in the embodiment and the modified examples and the detailed examples of SIB request method. For example, when a change message is received from the base station 10 via the signal receiving unit 22, the system information acquisition control unit 24 requests a necessary SIB(s) among SIB(s) indicated by the change message to the base station 10 via the signal transmitting unit 21 and acquires the necessary SIB(s) via the signal receiving unit 22. The system information acquisition control unit 24 manages a validity period of each SIB stored in the system information storage unit 23 and requests the SIB of which the validity period expires to the base station 10.

The system information acquisition control unit 24 determines whether a SIB(s) request is necessary or unnecessary on the basis of SIB difference information and an ID of a SIB common area which are received from another cell when the user equipment 20 moves from a certain cell to another cell, and performs request and acquisition of a SIB(s) if necessary. The system information acquisition control unit 24 stores the SIB acquired from the base station 10 in the system information storage unit 23.

The system information acquisition control unit 24 can determine a SIB(s) which is supported/not supported in a serving cell on the basis of the value tag in the system information which is periodically broadcasted in accordance with the flow illustrated in FIG. 10. The system information acquisition control unit 24 has a function of requesting a SIB(s) to the base station 10 via the signal transmitting unit 21 and acquiring the SIB(s) from the base station 10 via the signal receiving unit 22. The system information acquisition control unit 24 may be included in the signal transmitting unit 21 and/or the signal receiving unit 22.

The configuration of the user equipment 20 illustrated in FIG. 25 may be embodied by a hardware circuit (for example, one or more IC chips) as a whole, or some may be constituted by a hardware circuit and the other may be realized by a CPU, a memory, and a program.

<Control Device 40>

Figure 26:
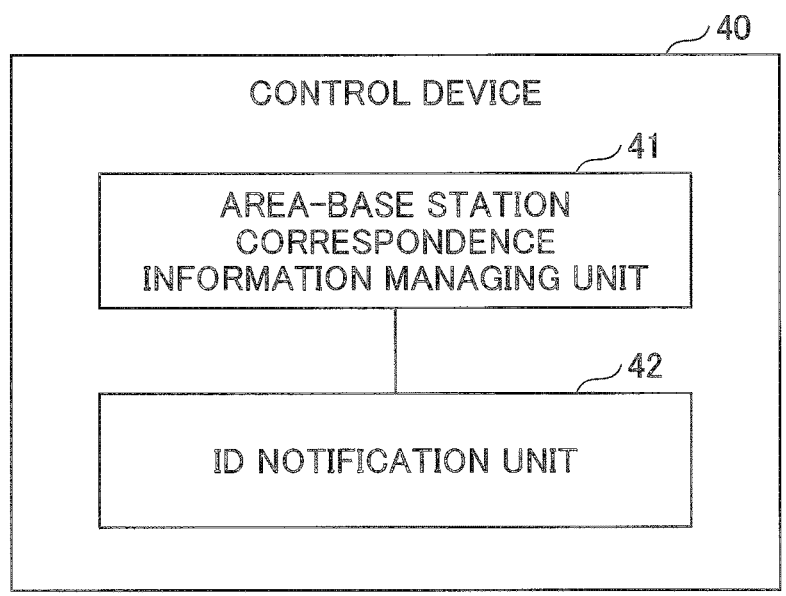
FIG. 26 is a diagram illustrating a configuration of a control device 40.

FIG. 26 illustrates a functional configuration diagram of the control device 40. As illustrated in FIG. 26, the control device 40 includes an area-base station correspondence information managing unit 41 and an ID notification unit 42. The area-base station correspondence information managing unit 41 manages a corresponding relationship between an ID of a SIB common area and a base station (or a cell) and holds information of the corresponding relationship.

For example, when the area-base station correspondence information is changed, the ID notification unit 42 transmits an ID of a SIB common area including the corresponding base stations to the base stations.

The configuration of the control device 40 illustrated in FIG. 26 may be embodied by a hardware circuit (for example, one or more IC chips) as a whole, or some may be constituted by a hardware circuit and the other may be realized by a CPU, a memory, and a program.

While the configurations of the base station 10, the user equipment 20, and the control device 40 have been described above, the configurations are only an example and the functional subdivisions, the names of the functional units, and the like are not limited to the above-mentioned example.

<Hardware Configuration>

The block diagrams (FIGS. 24 to 26) illustrate blocks in the units of functions. The functional blocks (constituent units) are embodied in a combination of hardware and/or software. Means for embodying the functional blocks is not particularly limited. That is, the functional blocks may be embodied by one unit which is physically and/or logically coupled or may be embodied by two or more units which are physically and/or logically separated and which are connected directly and/or indirectly (for example, in a wired and/or wireless manner).

Figure 27:
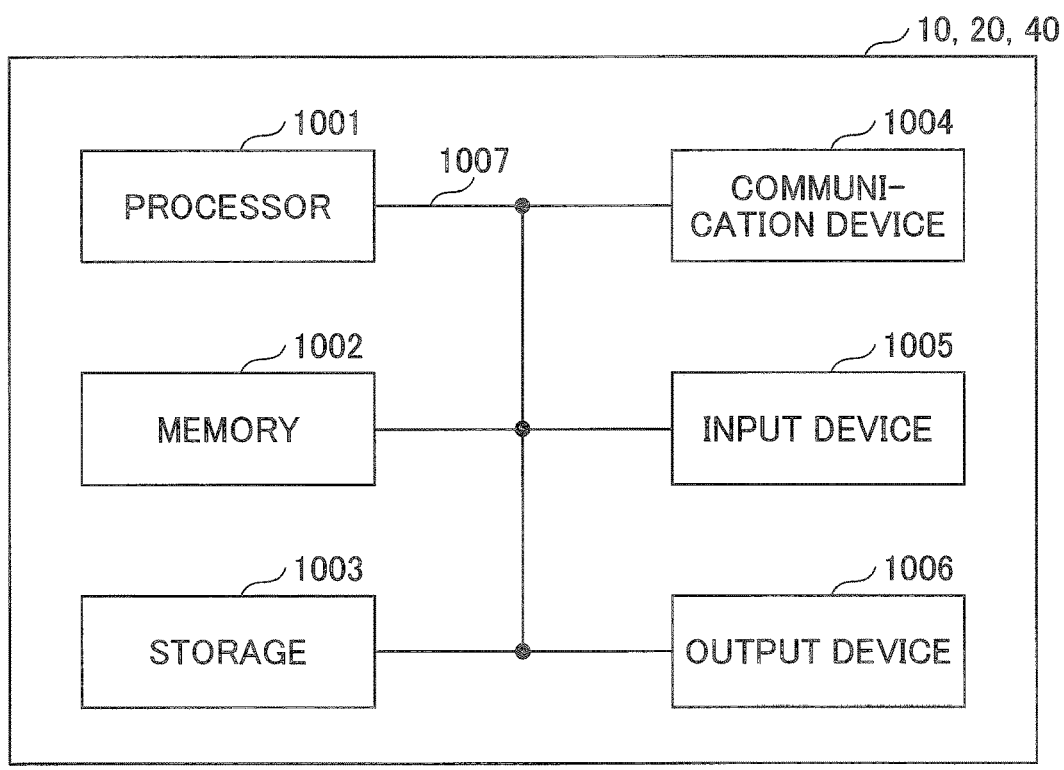
FIG. 27 is a diagram illustrating hardware configurations of a user equipment 20, a base station 10, and a control device 40.

For example, each of the base station 10, the user equipment 20, and the control device 40 in the embodiment of the invention may function as a computer that performs the processes according to the embodiment of the invention. FIG. 27 is a diagram illustrating an example of a hardware configuration of the base station 10, the user equipment 20, and the control device 40 according to the invention. The base station 10, the user equipment 20, and the control device 40 has the same hardware configuration and thus the hardware configuration is illustrated in a single diagram (FIG. 27).

As illustrated in FIG. 27, the base station 10, the user equipment 20, and the control device 40 may be physically configured as a computer device including a processor 1001, a memory 1002, a storage 1003, a communication device 1004, an input device 1005, an output device 1006, and a bus 1007.

In the following description, a word "device" may be referred to as a circuit, a device, a unit, or the like. The hardware configurations of the base station 10, the user equipment 20, and the control device 40 may include one or more devices (units) illustrated in the drawing or may not include some devices.

The functions of the base station 10, the user equipment 20, and the control device 40 are realized by causing hardware such as the processor 1001 and the memory 1002 to read predetermined software (a program) and causing the processor 1001 to perform computation and to control communication of the communication device 1004 and reading and/or writing of data in the memory 1002 and the storage 1003.

The processor 1001 controls the computer as a whole, for example, by operating an operating system. The processor 1001 may be constituted by a central processing unit (CPU) including an interface with peripherals, a control unit, a calculation unit, a register, and the like.

The processor 1001 reads a program (program codes), a software module, or data from the storage 1003 and/or the communication device 1004 to the memory 1002 and performs various processes in accordance therewith. As the program, a program causing a computer to perform at least a part of the operations described above in the embodiment is used. For example, the signal transmitting unit 11, the signal receiving unit 12, and the system information transmission control unit 13 of the base station 10 may be embodied by a control program which is stored in the memory 1002 and operated by the processor 1001. For example, the signal transmitting unit 21, the signal receiving unit 22, the system information storage unit 23, and the system information acquisition control unit 24 of the user equipment 20 may be embodied by a control program which is stored in the memory 1002 and operated by the processor 1001 or the other functional blocks. For example, the area-base station correspondence information managing unit 41 and the ID notification unit 42 of the control device 40 may be embodied by a control program which is stored in the memory 1002 and operated by the processor 1001.

Various processes described above have been described to be performed by a single processor 1001, but may be simultaneously or sequentially performed by two or more processors 1001. The processor 1001 may be mounted as one or more chips. The program may be transmitted from a network via an electric communication line.

The memory 1002 is a computer-readable recording medium and may be constituted, for example, by at least one of a read only memory (ROM), an erasable programmable ROM (EPROM), an electrically erasable programmable ROM (EEPROM), and a random access memory (RAM). The memory 1002 may be referred to as a register, a cache, or a main memory (a main storage unit). The memory 1002 can store a program (program codes), a software module, data, or the like which can be used to perform the processes according to the embodiment of the invention.

The storage 1003 is a computer-readable recording medium and may be constituted, for example, by at least one of an optical disc such as a compact disc ROM (CD-ROM), a hard disk drive, a flexible disk, a magneto-optical disk (such as a compact disk, a digital versatile disk, or a Blu-ray (registered trademark) disk), a smart card, a flash memory (such as a card, a stick, or a key drive), a floppy (registered trademark) disk, and a magnetic strip. The storage 1003 may be referred to as an auxiliary storage unit. Examples of the recording medium may include a database including the memory 1002 and/or the storage 1003, a server, and another appropriate medium.

The communication device 1004 is hardware (a transceiver device) that allows communication between computers via a wired and/or wireless network and is referred to as, for example, a network device, a network controller, a network card, or a communication module. For example, the signal transmitting unit 21 and the signal receiving unit 22 of the user equipment 20 may be embodied by the communication device 1004. The signal transmitting unit 11 and the signal receiving unit 12 of the base station 10 may be embodied by the communication device 1004. The ID notification unit 42 of the control device 40 may be embodied by the communication device 1004.

The input device 1005 is an input device (such as a keyboard, a mouse, a microphone, a switch, a button, or a sensor) that receives an input from the outside. The output device 1006 is an output device (such as a display, a speaker, or an LED lamp) that performs outputting to the outside. The input device 1005 and the output device 1006 may be configured as a unified body (such as a touch panel).

The units such as the processor 1001 and the memory 1002 are connected to each other via the bus 1007 for transmitting and receiving information. The bus 1007 may be constituted by a single bus or may be configured by different buses for the units.

The base station 10, the user equipment 20, and the control device 40 may be configured to include hardware such as a microprocessor, a digital signal processor (DSP), an application specific integrated circuit (ASIC), a programmable logic device (PLD), or a field programmable gate array (FPGA) or a part or all of the functional blocks may be embodied by the hardware. For example, the processor 1001 may be mounted as at least one hardware module.

(Conclusion of Embodiment)

As described above, according to the embodiment of the invention, there is provided a user equipment that communicates with a base station in a mobile communication system, the user equipment including: a receiving unit configured to receive a change message of system information from the base station; and a control unit configured to request the base station to transmit the system information when the receiving unit has received the change message and then has not received the system information.

According to this configuration, in a system in which a base station transmits system information on the basis of a request from a user equipment, even when the system information is changed, the base station can transmit the system information based on the request from the user equipment and it is thus possible to decrease overheads due to transmission of system information.

The control unit may request the base station to transmit the system information when it is detected that a validity period of the system information received from the base station expires. According to this configuration, the user equipment can continuously hold the system information within the valid period.

According to the embodiment of the invention, there is provided a user equipment that communicates with a base station in a mobile communication system, the user equipment including: a receiving unit configured to receive difference information indicating that system information in a neighboring cell is different from the system information in a cell of the base station from the base station; and a control unit configured to request the base station to transmit the system information indicated by the difference information received by the receiving unit.

According to this configuration, in a system in which a base station transmits system information on the basis of a request from a user equipment, even when the system information differs depending on the cells, the base station can transmit the system information based on the request from the user equipment without performing an operation of always broadcasting system information different from that of a neighboring cell and it is thus possible to decrease overheads due to transmission of system information.

According to the embodiment of the invention, there is provided a user equipment that communicates with a base station in a mobile communication system, the user equipment including: a receiving unit configured to receive identification information of an area in which system information is common to cells from the base station; and a control unit configured to request the base station to transmit the system information when it is detected that the user equipment moves from another area to the area on the basis of the identification information received by the receiving unit.

According to this configuration, in a system in which a base station transmits system information on the basis of a request from a user equipment, even when the system information differs depending on the areas, the base station can transmit the system information based on the request from the user equipment without performing an operation of always broadcasting system information different from that of a neighboring area and it is thus possible to decrease overheads due to transmission of system information.

According to the modified examples, there is provided a user equipment that communicates with a base station in a mobile communication system, the user equipment including: a receiving unit configured to receive broadcast information which is periodically transmitted from the base station; and a control unit configured to request the base station to transmit predetermined system information and acquire the predetermined system information from the base station when information indicating that the base station supports the predetermined system information is detected from the broadcast information received by the receiving unit. According to this configuration, since the base station does not have to always periodically transmit predetermined system information, it is possible to decrease overheads due to transmission of system information.

For example, the control unit may request the predetermined system information by transmitting, to the base station, a signal including a bitmap indicating the predetermined system information and including a random access preamble. The control unit may request the predetermined system information by transmitting, to the base station, a bitmap indicating the predetermined system information and a random access preamble in a same TTI. The control unit may transmit a random access preamble corresponding to a part of the predetermined system information to the base station to request the part of the predetermined system information, and transmit a message including a bitmap indicating the predetermined system information excluding the part of the system information to the base station to request the predetermined system information excluding the part of the system information.

According to the embodiment of the invention, there is provided a base station that communicates with a user equipment in a mobile communication system, the base station including: a transmitting unit configured to transmit difference information indicating that system information in a neighboring cell is different from system information in a cell of the base station; and a receiving unit configured to receive a request for transmission of the system information indicated by the difference information from the user equipment, in which the transmitting unit transmits the system information to the user equipment when the receiving unit receives the request.

According to this configuration, in a system in which a base station transmits system information on the basis of a request from a user equipment, even when the system information differs depending on the cells, the base station can transmit the system information based on the request from the user equipment without performing an operation of always broadcasting system information different from that of a neighboring cell and it is thus possible to decrease overheads due to transmission of system information.

While embodiments of the invention have been described above, the disclosed inventions are not limited to the embodiments, but it could be understood by those skilled in the art that various modifications, corrections, alternatives, replacements, and the like can be made thereto. While specific numerical examples have been used to facilitate understanding of the invention, the numerical values are only an example and appropriate values may be used, unless otherwise specified. The sorting of articles in the above description is not essential to the invention, but details described in two or more articles may be combined for use if necessary, or details of a certain article may be applied to details described in another article (unless incompatible). The boundaries of the functional units or the processing units in the functional block diagrams cannot be said to correspond to boundaries of physical components. The operations of two or more functional units may be performed by a single physical component or the operation of a single functional unit may be performed by two or more physical components.

Notification of information is not limited to the aspects/embodiments described in this specification, but may be performed using other methods. For example, the notification of information may be performed by physical layer signaling (such as downlink control information (DCI) or uplink control information (UCI)), upper layer signaling (such as radio resource control (RRC) signal, medium access control (MAC) signaling, or broadcast information (master information block (MIB) and system information block (SIB))), other signals, or combinations thereof. The RRC signaling may be referred to as an RRC message and may be, for example, an RRC connection setup message or an RRC connection reconfiguration message.

The aspects/embodiments described in this specification may be applied to systems employing long term evolution (LTE), LTE-advanced (LTE-A), SUPER 3G, IMT-Advanced, 4G, 5G, future radio access (FRA), W-CDMA (registered trademark), GSM (registered trademark), CDMA2000, ultra mobile broadband (UMB), IEEE 802.11 (Wi-Fi), IEEE 802.16 (WiMAX), IEEE 802.20, ultra-wideband (UWB), Bluetooth (registered trademark), or other appropriate systems and/or next-generation systems to which the systems are extended.

The processing sequences, the sequences, and the like of the embodiment/examples described above in this specification may be changed in the order as long as they are not incompatible with each other. For example, in the method described in this specification, various steps as elements are described in an exemplary order and the method is not limited to the described order.

The input and output information or the like may be stored in a specific place (for example, a memory) or may be managed in a management table. The input and output information or the like may be overwritten, updated, or added. The output information or the like may be deleted. The input information or the like may be transmitted to another device.

Notification of predetermined information (for example, notification of "X") is not limited to explicit notification, but may be performed by implicit notification (for example, notification of the predetermined information is not performed).

Information, signals, and the like described in this specification may be expressed using one of various different techniques. For example, data, an instruction, a command, information, a signal, a bit, a symbol, and a chip which can be mentioned in the overall description may be expressed by a voltage, a current, an electromagnetic wave, a magnetic field or magnetic particles, a photo field or photons, or an arbitrary combination thereof.

The terms described in this specification and/or the terms required for understanding this specification may be substituted by terms having the same or similar meanings. For example, a message may be a signal.

The information, the parameters, and the like described above in this specification may be expressed by absolute values, may be expressed by relative values to predetermined values, or may be expressed by corresponding other information. A reference signal may be abbreviated to RS or may be referred to as a pilot depending on an applied standard.

Specific operations which are performed by the base station in this specification may be performed by an upper node thereof in some cases. In a network including one or more network nodes including a base station, various operations which are performed to communicate with a user equipment 20 can be apparently performed by the base station and/or network nodes (for example, an MME or an S-GW can be considered but the network nodes are not limited thereto) other than the base station 10. A case in which the number of network nodes other than the base station is one has been described above, but a combination of plural different network nodes (for example, an MME and an S-GW) may be used.

The aspects described in this specification may be used alone, may be used in combination, or may be switched with implementation thereof.

The user equipment may also be referred to as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or several appropriate terms by those skilled in the art.

The base station may be referred to as an NodeB (NB), an enhanced NodeB (eNB), a base station, gNB or some other appropriate terms by those skilled in the art.

The terms "determining (determining)" and "deciding (determining)" used in this specification may include various types of operations. For example, "determining" and "deciding" may include deeming that to perform judging, calculating, computing, processing, deriving, investigating, looking up (e.g., search in a table, a database, or another data structure), or ascertaining is to perform "determining" or "deciding". Furthermore, "determining" and "deciding" may include deeming that to perform receiving (e.g., reception of information), transmitting (e.g., transmission of information), input, output, or accessing (e.g., accessing data in memory) is to perform "determining" or "deciding". Furthermore, "determining" and "deciding" may include deeming that to perform resolving, selecting, choosing, establishing, or comparing is to perform "determining" or "deciding". Namely, "determining" and "deciding" may include deeming that some operation is to perform "determining" or "deciding".

An expression "on the basis of ~" which is used in this specification does not refer to only "on the basis of only ~," unless apparently described. In other words, the expression "on the basis of ~" refers to both "on the basis of only ~" and "on the basis of at least ~."

So long as terms "include" and "including" and modifications thereof are used in this specification or the appended claims, the terms are intended to have a comprehensive meaning similar to a term "comprising." A term "or" which is used in this specification or the claims is intended not to mean an exclusive or.

In the entire disclosure, for example, when an article such as a, an, or the is added in translation into English, such an article refers to including the plural unless otherwise recognized from the context.

The invention is not limited to the above-mentioned embodiment, but various modifications, corrections, alternatives, replacements, and the like are included in the invention without departing from the spirit of the invention.

This patent application is based on and claims priority to Japanese patent application No. 2016-96525 filed on May 12, 2016, and Japanese patent application No. 2016-158262 filed on Aug. 10, 2016, and the entire contents of the Japanese Patent Application No. 2016-96525 and Japanese patent application No. 2016-158262 are incorporated herein by reference.

EXPLANATIONS OF LETTERS OR NUMERALS 10 base station
11 signal transmitting unit
12 signal receiving unit
13 system information transmission control unit
20 user equipment
21 signal transmitting unit
22 signal receiving unit
23 system information storage unit
24 system information acquisition control unit
30 core network
40 control device
41 area-base station correspondence information managing unit
42 ID notification unit
1001 processor
1002 memory
1003 storage
1004 communication device
1005 input device
1006 output device

The invention claimed is:
1. A terminal comprising:
a receiving unit that receives, from a base station, first area identification information that is identification information of an area in which a system information block (SIB) is common to cells;

a storage unit that stores second area identification information received before reception of the first area identification information; and a control unit that compares the first area identification information with the second area identification information, and transmits a random access preamble to the base station as a request for the SIB when determining that the first area identification information is different from the second area identification information, wherein the area includes the cells, and the SIB is common to the cells in the area, and wherein the control unit transmits the random access preamble that is associated with the SIB to the base station as the request for the SIB.

2. A system information acquisition method performed by a terminal comprising:

receiving, from a base station, first area identification information that is identification information of an area in which a system information block (SIB) is common to cells;

storing, by the terminal, second area identification information that is received before the first area identification information;

comparing the first area identification information with the second area identification information; and requesting the SIB of the base station by transmitting a random access preamble to the base station when determining that the first area identification information is different from the second area identification information, wherein the area includes the cells, and the SIB is common to the cells in the area, and wherein the terminal transmits the random access preamble that is associated with the SIB to the base station as the request for the SIB.

3. A base station comprising:

a transmission unit that transmits, to a terminal, first area identification information that is identification information of an area in which a system information block (SIB) is common to cells, wherein the terminal compares the first area identification information with second area identification information that is received by the terminal before the first area identification information and stored by the terminal; and a receiving unit that receives a random access preamble from the terminal as a request for the SIB when the terminal determines that the first area identification information is different from the second area identification information, wherein the area includes the cells, and the SIB is common to the cells in the area, and wherein the receiving unit receives the random access preamble that is associated with the SIB from the terminal as the request for the SIB.

4. A system comprising:

a terminal comprising:

a receiving unit that receives, from a base station, first area identification information that is identification information of an area in which a system information block (SIB) is common to cells;

a storage unit that stores second area identification information received before reception of the first area identification information; and a control unit that compares the first area identification information with the second area identification information, and requests the SIB of the base station by transmitting a random access preamble to the base station when determining the first area identification information is different from the second area identification information, wherein the area includes the cells, and the SIB is common to the cells in the area, and wherein the control unit transmits the random access preamble that is associated with the SIB to the base station as the request for the SIB, and a base station comprising:

a transmission unit that transmits, to the terminal, the first area identification information that is identification information of the area in which the system information block (SIB) is common to cells; and a receiving unit that receives a request for the SIB from the terminal when the first area identification information is different from the second area identification information.

* * * * *